United States Patent
Taniguchi

(10) Patent No.: US 10,798,038 B2
(45) Date of Patent: Oct. 6, 2020

(54) COMMUNICATION CONTROL METHOD AND INFORMATION PROCESSING APPARATUS

(71) Applicant: LINE Corporation, Shibuya-ku, Tokyo (JP)

(72) Inventor: Tomohiko Taniguchi, Tokyo (JP)

(73) Assignee: LINE CORPORATION, Tokyo (JP)

( * ) Notice: Subject to any disclaimer, the term of this patent is extended or adjusted under 35 U.S.C. 154(b) by 323 days.

(21) Appl. No.: 15/085,024

(22) Filed: Mar. 30, 2016

(65) Prior Publication Data

US 2017/0180292 A1 Jun. 22, 2017

(30) Foreign Application Priority Data

Dec. 22, 2015 (JP) ................................. 2015-250307

(51) Int. Cl.
*H04L 12/58* (2006.01)

(52) U.S. Cl.
CPC .............. *H04L 51/14* (2013.01); *H04L 51/32* (2013.01)

(58) Field of Classification Search
CPC ................................ H04L 51/14; H04L 51/32
See application file for complete search history.

(56) References Cited

U.S. PATENT DOCUMENTS

| | | | | |
|---|---|---|---|---|
| 6,772,130 B1 * | 8/2004 | Karbowski | ............ | G06Q 10/08 705/26.1 |
| 6,993,489 B1 * | 1/2006 | Miglautsch | .......... | G06Q 10/067 705/348 |
| 7,092,509 B1 * | 8/2006 | Mears | ................. | H04M 3/5233 379/266.01 |
| 7,305,069 B1 * | 12/2007 | Day | .................. | H04M 3/53333 379/88.13 |
| 7,882,186 B1 * | 2/2011 | Sun | ...................... | G06Q 10/107 709/203 |
| 9,118,763 B1 * | 8/2015 | Margulies | ........... | H04M 3/5191 |
| 9,313,151 B1 * | 4/2016 | Wheeler | ............. | G06Q 10/107 |
| 9,531,862 B1 * | 12/2016 | Vadodaria | ......... | H04M 1/72552 |
| 9,787,840 B1 * | 10/2017 | Neuer, III | ........... | H04M 3/5232 |
| 9,836,543 B2 * | 12/2017 | Andrews | ........... | G06F 17/30864 |
| 10,372,291 B1 * | 8/2019 | Lewis | ................. | G06F 3/04817 |

(Continued)

FOREIGN PATENT DOCUMENTS

| | | |
|---|---|---|
| JP | 2004088674 A | 3/2004 |
| JP | 2005157952 A | 6/2005 |

OTHER PUBLICATIONS

Office Action for corresponding Japanese Application No. 2015-250307 dated Feb. 21, 2017.

*Primary Examiner* — Blake J Rubin
(74) *Attorney, Agent, or Firm* — Harness, Dickey & Pierce, P.L.C.

(57) ABSTRACT

A communication control method is for performing a process executed by a computer including a processor. The process includes storing, in a storage device of an information processing apparatus, a correspondence relationship of a first user, a second user associated with the first user, and a third user associated with the second user; receiving, at the information processing apparatus, a message from the first user to the third user, from a terminal of the first user; and sending, by the information processing apparatus, the message received from the terminal of the first user as a message from the second user, to a terminal of the third user.

18 Claims, 30 Drawing Sheets

(56) References Cited

U.S. PATENT DOCUMENTS

| | | | |
|---|---|---|---|
| 2001/0005859 A1* | 6/2001 | Okuyama | H04L 29/00 709/245 |
| 2002/0078158 A1* | 6/2002 | Brown | H04L 29/06027 709/206 |
| 2002/0120600 A1* | 8/2002 | Schiavone | H04L 51/12 |
| 2002/0169835 A1* | 11/2002 | Paul, Jr. | G06Q 10/107 709/206 |
| 2003/0101227 A1* | 5/2003 | Fink | H04L 29/06 709/207 |
| 2005/0004837 A1* | 1/2005 | Sweeney | G06Q 30/02 705/14.16 |
| 2005/0013291 A1* | 1/2005 | Yamamoto | H04L 51/14 370/352 |
| 2005/0111653 A1 | 5/2005 | Joyce et al. | |
| 2005/0251555 A1* | 11/2005 | Little, II | H04L 51/043 709/206 |
| 2006/0106914 A1* | 5/2006 | Plow | H04L 51/12 709/206 |
| 2006/0129629 A1* | 6/2006 | Kawashima | G06Q 10/107 709/203 |
| 2006/0168057 A1* | 7/2006 | Warren | H04L 51/12 709/206 |
| 2006/0195533 A1* | 8/2006 | Isozaki | G06Q 10/107 709/206 |
| 2006/0248184 A1* | 11/2006 | Wu | H04L 67/24 709/224 |
| 2006/0263757 A1* | 11/2006 | Bender | G06Q 10/06 434/350 |
| 2007/0005713 A1* | 1/2007 | LeVasseur | H04L 63/126 709/206 |
| 2007/0078965 A1* | 4/2007 | Shimamura | H04L 51/043 709/224 |
| 2008/0052364 A1* | 2/2008 | Zhou | G06Q 10/107 709/206 |
| 2008/0147470 A1* | 6/2008 | Johri | G06Q 10/06 379/265.11 |
| 2009/0006563 A1* | 1/2009 | Lev | H04L 67/104 709/206 |
| 2009/0024706 A1* | 1/2009 | Janakiraman | G06Q 10/107 709/206 |
| 2009/0037350 A1* | 2/2009 | Rudat | G06Q 10/107 706/11 |
| 2009/0088198 A1* | 4/2009 | Cheng | H04W 8/26 455/551 |
| 2009/0106557 A1* | 4/2009 | Leonard | H04L 51/12 713/179 |
| 2009/0119758 A1* | 5/2009 | Tsuchiya | H04L 51/28 726/5 |
| 2009/0144329 A1* | 6/2009 | Marlow | G06Q 10/107 |
| 2009/0144380 A1* | 6/2009 | Kallman | G06Q 10/107 709/206 |
| 2009/0177484 A1* | 7/2009 | Davis | G06Q 30/02 705/346 |
| 2009/0182832 A1* | 7/2009 | O'Sullivan | G06Q 10/107 709/207 |
| 2009/0228312 A1* | 9/2009 | Cazares | G06Q 10/06 705/7.16 |
| 2010/0121709 A1* | 5/2010 | Berezin | G06Q 30/0185 705/14.51 |
| 2010/0121925 A1* | 5/2010 | Champlin-Scharff | G06Q 10/107 709/206 |
| 2010/0178902 A1* | 7/2010 | Boctor | H04W 4/00 455/414.3 |
| 2010/0287131 A1* | 11/2010 | Church | G06Q 10/00 706/47 |
| 2011/0040595 A1* | 2/2011 | Chou | H04W 4/029 705/7.42 |
| 2011/0150208 A1* | 6/2011 | Stearns | H04M 3/5158 379/266.07 |
| 2011/0194684 A1* | 8/2011 | Ristock | H04M 3/51 379/265.02 |
| 2011/0208822 A1* | 8/2011 | Rathod | G06F 16/9535 709/206 |
| 2011/0246584 A1* | 10/2011 | Vitaldevara | H04L 51/12 709/206 |
| 2011/0265016 A1* | 10/2011 | Koopman | G06Q 10/107 715/752 |
| 2012/0265697 A1* | 10/2012 | Tuchman | G06Q 30/016 705/304 |
| 2012/0278115 A1* | 11/2012 | Acharya | G06Q 30/02 705/7.13 |
| 2013/0006627 A1* | 1/2013 | Guthery | G10L 15/26 704/235 |
| 2013/0060856 A1* | 3/2013 | Fried | G06Q 10/10 709/204 |
| 2013/0090963 A1* | 4/2013 | Sharma | G06Q 10/063112 705/7.13 |
| 2013/0157626 A1* | 6/2013 | Talwar | H04W 4/14 455/413 |
| 2013/0185368 A1* | 7/2013 | Nordstrom | H04W 4/21 709/206 |
| 2013/0212194 A1* | 8/2013 | Shaw | H04L 63/126 709/206 |
| 2013/0215213 A1* | 8/2013 | Power | H04N 7/15 348/14.02 |
| 2013/0254305 A1* | 9/2013 | Cheng | H04L 51/32 709/206 |
| 2013/0268600 A1* | 10/2013 | Chacko | H04L 51/066 709/206 |
| 2013/0339453 A1* | 12/2013 | Aggarwal | H04L 51/20 709/206 |
| 2014/0074629 A1* | 3/2014 | Rathod | G06Q 10/10 705/14.73 |
| 2014/0164011 A1* | 6/2014 | Guelich | G16H 40/20 705/2 |
| 2014/0278940 A1* | 9/2014 | Wade | G06Q 30/0264 705/14.45 |
| 2014/0330915 A1* | 11/2014 | Murphy | H04L 51/063 709/206 |
| 2015/0067073 A1* | 3/2015 | Wagner | H04L 12/1859 709/206 |
| 2015/0081722 A1* | 3/2015 | Terada | G06F 17/30569 707/748 |
| 2015/0100645 A1* | 4/2015 | Steinmann | H04L 51/34 709/206 |
| 2015/0127733 A1* | 5/2015 | Ding | H04W 4/08 709/204 |
| 2015/0156148 A1* | 6/2015 | Doulton | H04L 51/063 709/206 |
| 2015/0156153 A1* | 6/2015 | Deselaers | H04L 51/16 709/206 |
| 2015/0341304 A1* | 11/2015 | Sherman | H04L 51/32 709/206 |
| 2015/0363736 A1* | 12/2015 | Flannery | G06Q 10/06398 705/7.42 |
| 2015/0379562 A1* | 12/2015 | Spievak | H04M 3/5158 379/265.09 |
| 2016/0057284 A1* | 2/2016 | Nagpal | H04M 3/323 379/266.07 |
| 2016/0063608 A1* | 3/2016 | Hawilo | H04W 4/21 705/26.81 |
| 2016/0094566 A1* | 3/2016 | Parekh | H04L 63/0414 726/1 |
| 2016/0173430 A1* | 6/2016 | Foladare | H04L 67/26 709/206 |
| 2016/0182429 A1* | 6/2016 | Mirski-Fitton | H04L 51/14 709/206 |
| 2016/0182440 A1* | 6/2016 | Wang | H04L 41/085 709/204 |
| 2016/0323230 A1* | 11/2016 | Marso | H04L 51/32 |
| 2016/0352895 A1* | 12/2016 | Son | G10L 13/033 |
| 2016/0359793 A1* | 12/2016 | Kraios | H04L 51/34 |
| 2016/0364732 A1* | 12/2016 | Jagatheesan | G06Q 30/016 |
| 2016/0371756 A1* | 12/2016 | Yokel | H04L 51/16 |
| 2017/0032425 A1* | 2/2017 | Edwards | G06Q 30/0269 |
| 2017/0169480 A1* | 6/2017 | Canon | G06Q 30/0255 |
| 2017/0214649 A1* | 7/2017 | Tomkow | H04L 51/30 |

(56) References Cited

U.S. PATENT DOCUMENTS

2017/0324785 A1* 11/2017 Taine .................. H04L 65/1069
2017/0331916 A1* 11/2017 Banatwala ............ H04L 67/306
2018/0013698 A1* 1/2018 Vendrow ................ G06F 3/015

* cited by examiner

FIG.6A

| ADMINISTRATOR | PERSON IN CHARGE | CUSTOMER |
|---|---|---|
| XXX | A | #1<br>#2<br>#3 |
| | B | #4<br>#5<br>#6 |
| | C | #7<br>#8<br>#9 |
| | ⋮ | ⋮ |
| | Z | #N<br>#N+1<br>#N+2 |

FIG.6B

| USER IDENTIFIER | USER ATTRIBUTE | BELONGING ORGANIZATION |
|---|---|---|
| XXX | ADMINISTRATOR | BELONGING ORGANIZATION A |
| A | PERSON IN CHARGE | BELONGING ORGANIZATION A |
| B | PERSON IN CHARGE | BELONGING ORGANIZATION A |
| ⋮ | ⋮ | ⋮ |
| #1 | GENERAL USER | |
| #2 | GENERAL USER | |

FIG.7

| PERSON IN CHARGE | STATE OF PERSON IN CHARGE | SUBSTITUTE PERSON IN CHARGE |
|---|---|---|
| A | ON DUTY | |
| B | ON BREAK | K |
| C | ON DUTY | |
| ⋮ | ⋮ | |
| Z | ON VACATION | |

FIG.8

| PERSON IN CHARGE | CUSTOMER | MESSAGE ID | TRANSMISSION RECEPTION TIME AND DATE | TRANSMISSION SOURCE | MESSAGE CONTENT |
|---|---|---|---|---|---|
| A | #1 | ... ... ... | 2015/12/15 10:00 | PERSON IN CHARGE A | ... ... ... |
| | | | 2015/12/15 10:05 | ADMINISTRATOR XXX | |
| | | | 2015/12/15 11:10 | CUSTOMER #1 | |
| | #2 | ... ... ... | 2015/12/14 9:00 | ADMINISTRATOR XXX | ... ... ... |
| | | | 2015/12/15 15:10 | CUSTOMER #2 | |
| | | | 2015/12/15 16:20 | PERSON IN CHARGE A | |
| | #3 | ... ... ... | 2015/12/13 17:10 | PERSON IN CHARGE A | ... ... ... |
| | | | 2015/12/14 8:05 | ADMINISTRATOR XXX | |
| | | | 2015/12/15 13:10 | CUSTOMER #3 | |

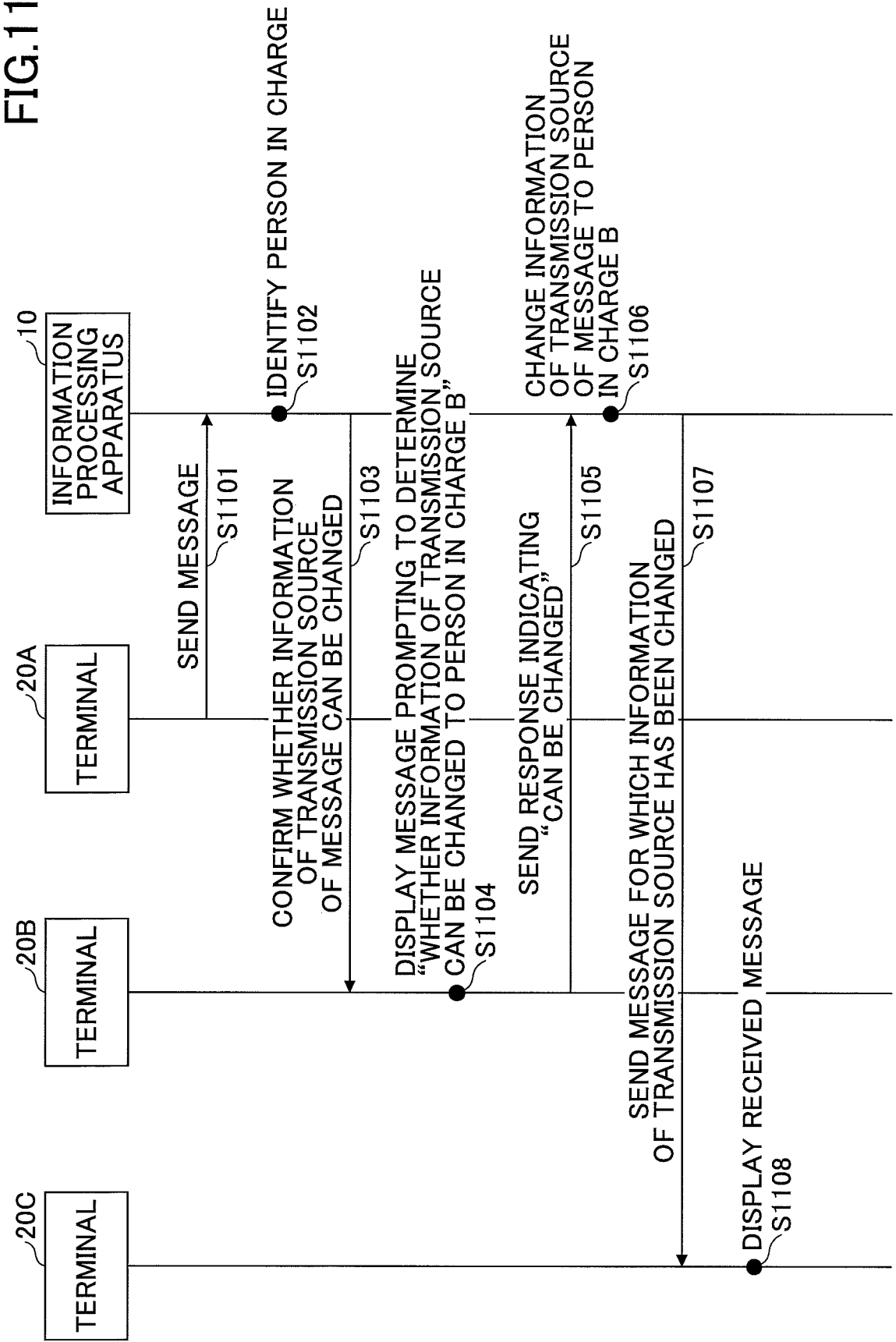

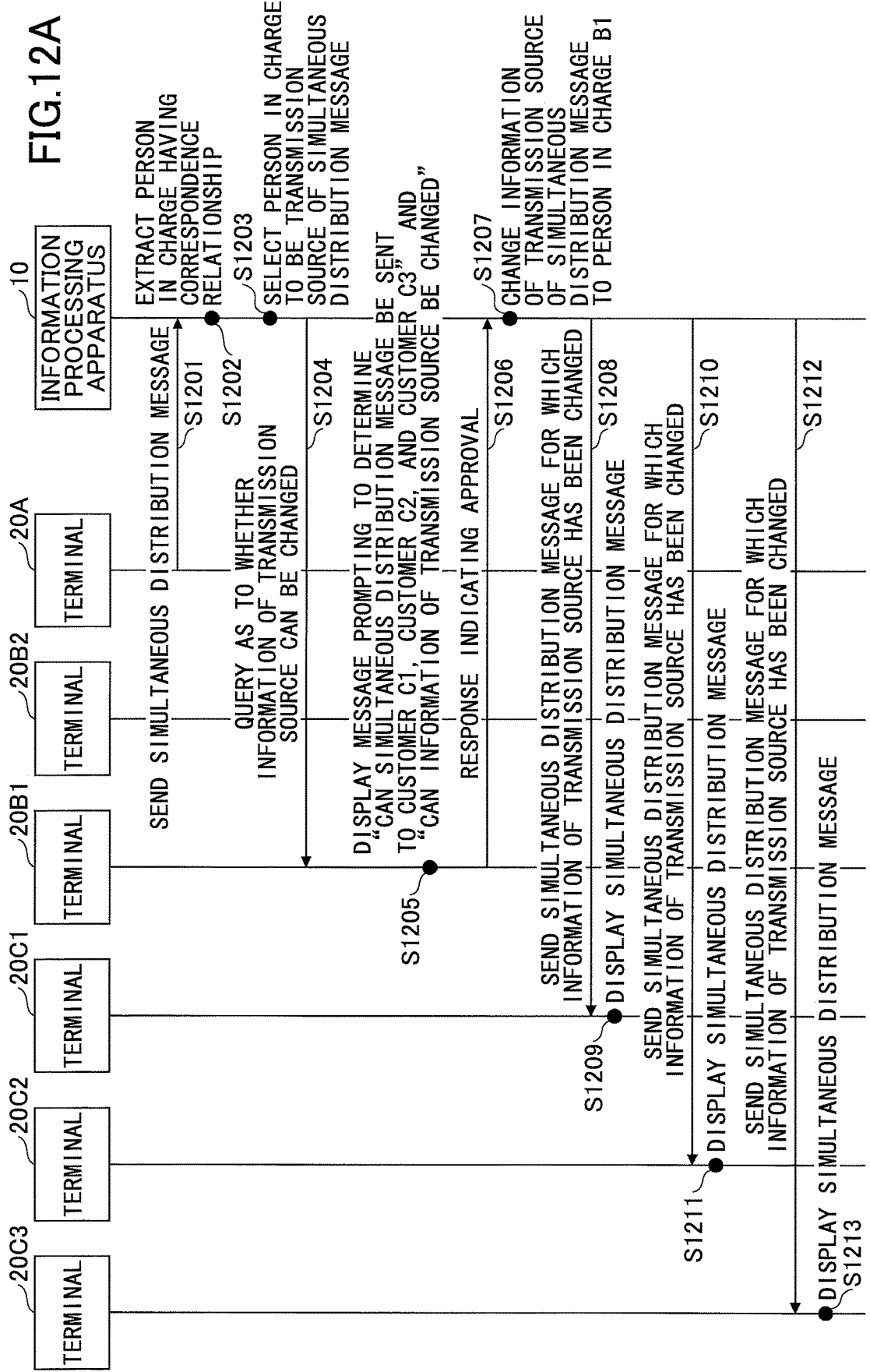

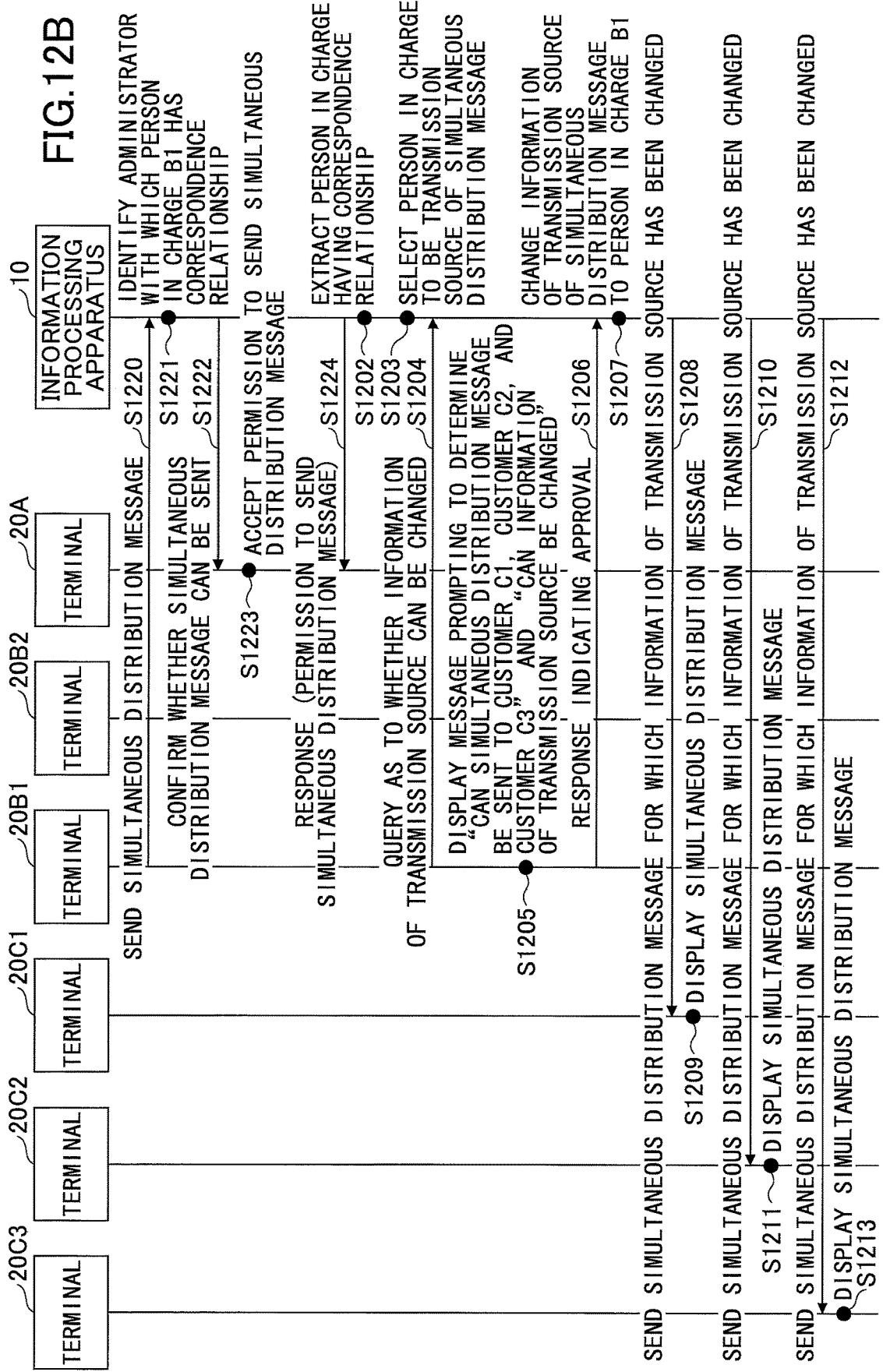

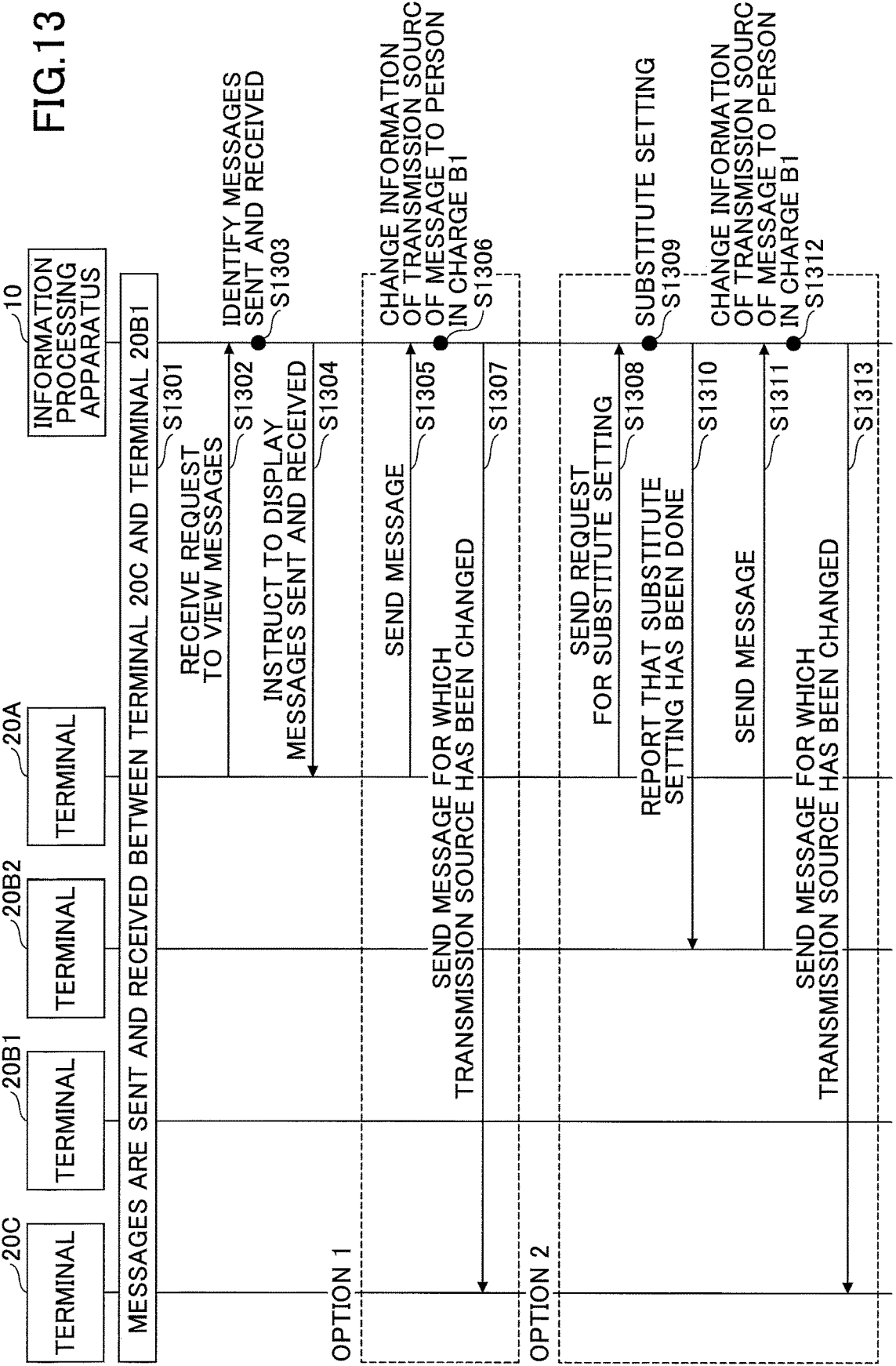

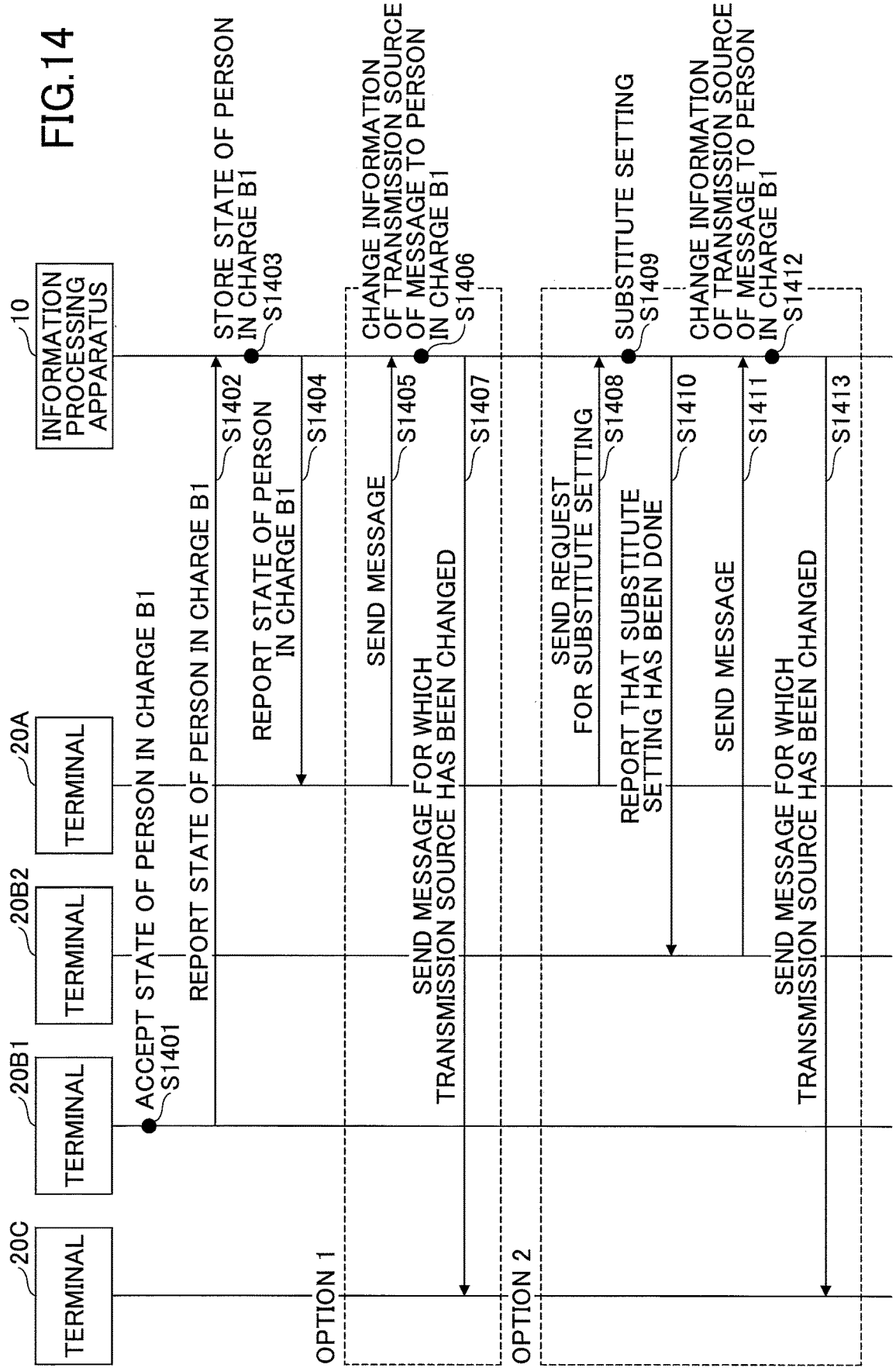

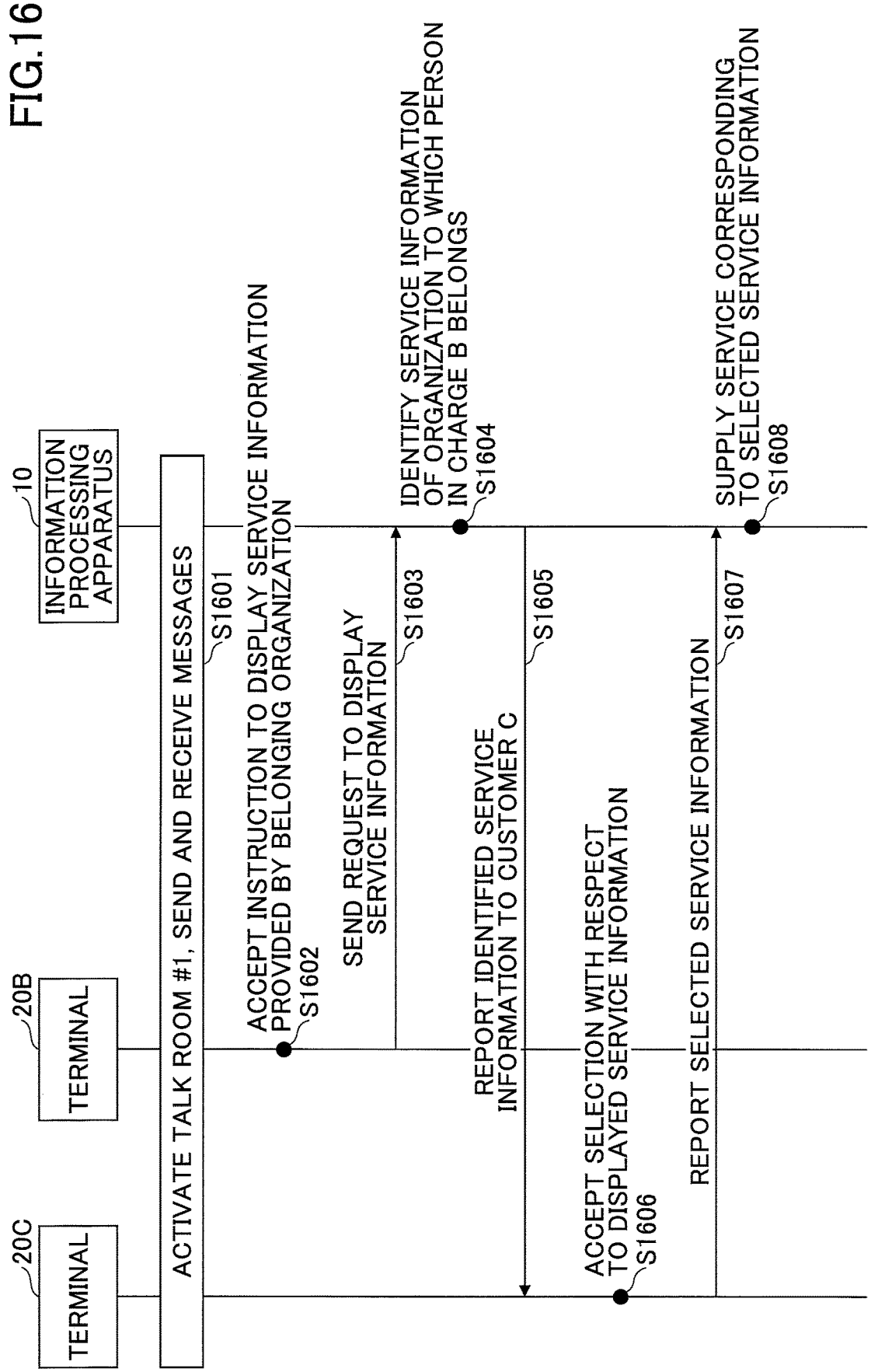

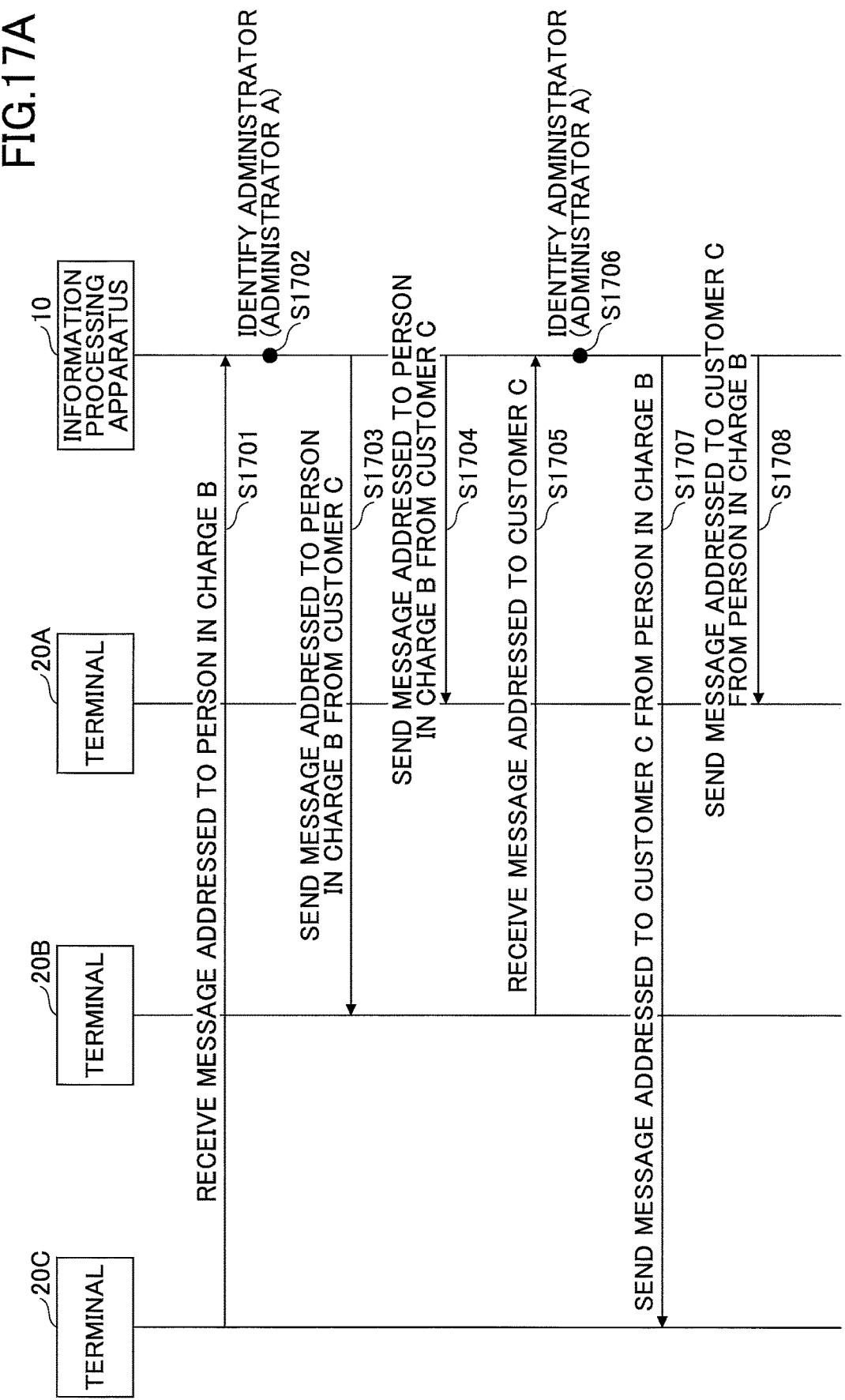

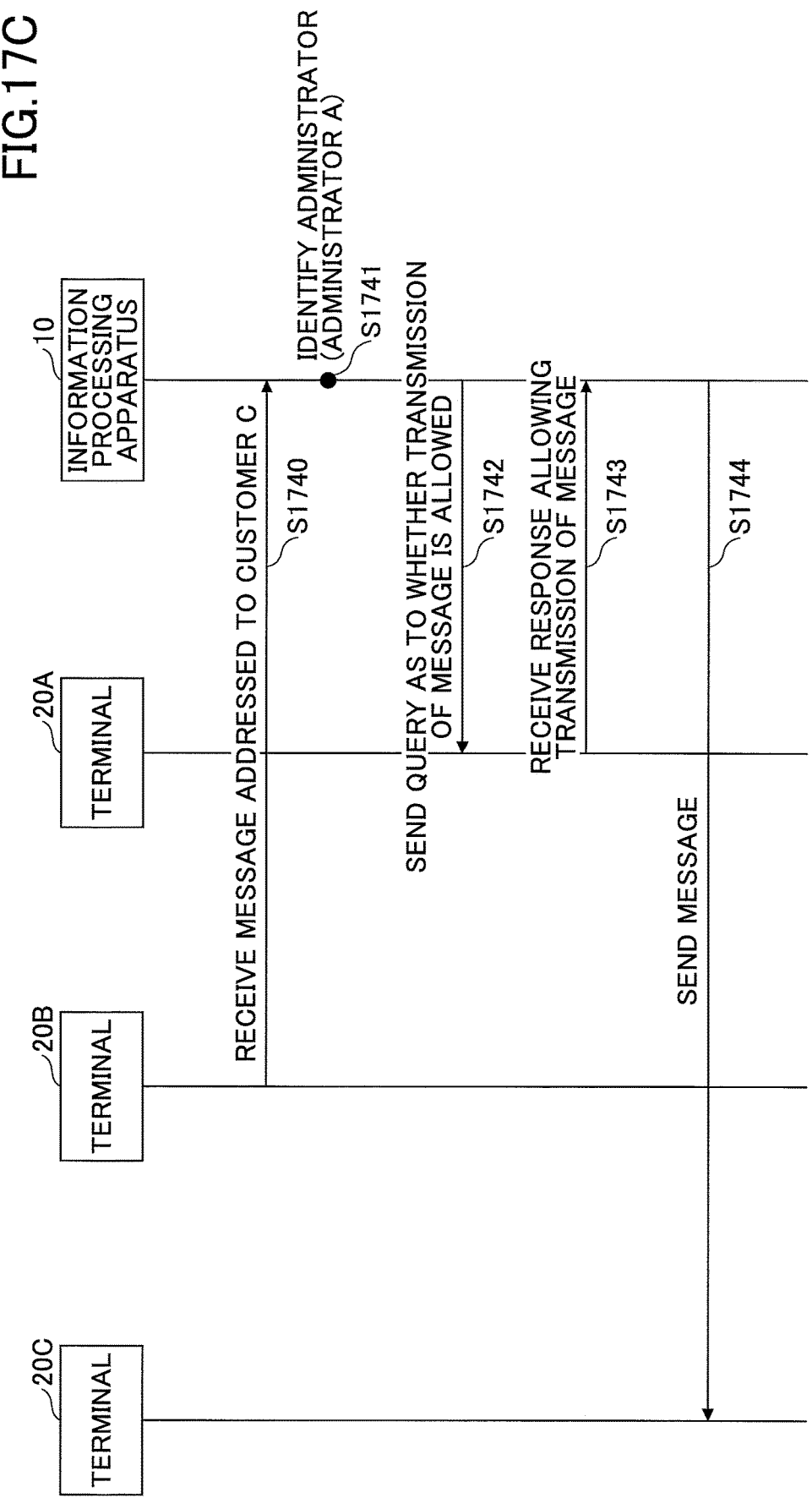

FIG.21

XXX HAIR SALON RESERVATION MENU

20C

◀ PREVIOUS WEEK    NEXT WEEK ▶

| TIME AND DATE | NOVEMBER 2015 | | | | | | |
|---|---|---|---|---|---|---|---|
| | 13 (FRI) | 14 (SAT) | 15 (SUN) | 16 (MON) | 17 (TUE) | 18 (WED) | 19 (THU) |
| 10:00 | – | × | ○ | – | – | – | – |
| 10:30 | – | × | ○ | – | – | – | – |
| 11:00 | × | ○ | ○ | × | × | × | × |
| 11:30 | × | ○ | ○ | × | × | × | × |
| 12:00 | × | ○ | ○ | × | × | × | × |
| 12:30 | × | ○ | ○ | × | × | × | × |
| 13:00 | × | ○ | ○ | × | × | × | × |
| 13:30 | × | ○ | ○ | × | × | × | × |
| 14:00 | TEL | ○ | ○ | × | × | × | × |
| 14:30 | ○ | ○ | ○ | × | × | × | × |
| 15:00 | ○ | ○ | ○ | × | × | × | × |
| 15:30 | ○ | × | ○ | × | × | × | × |
| 16:00 | ○ | × | ○ | × | × | × | × |
| 16:30 | ○ | × | ○ | × | × | × | × |

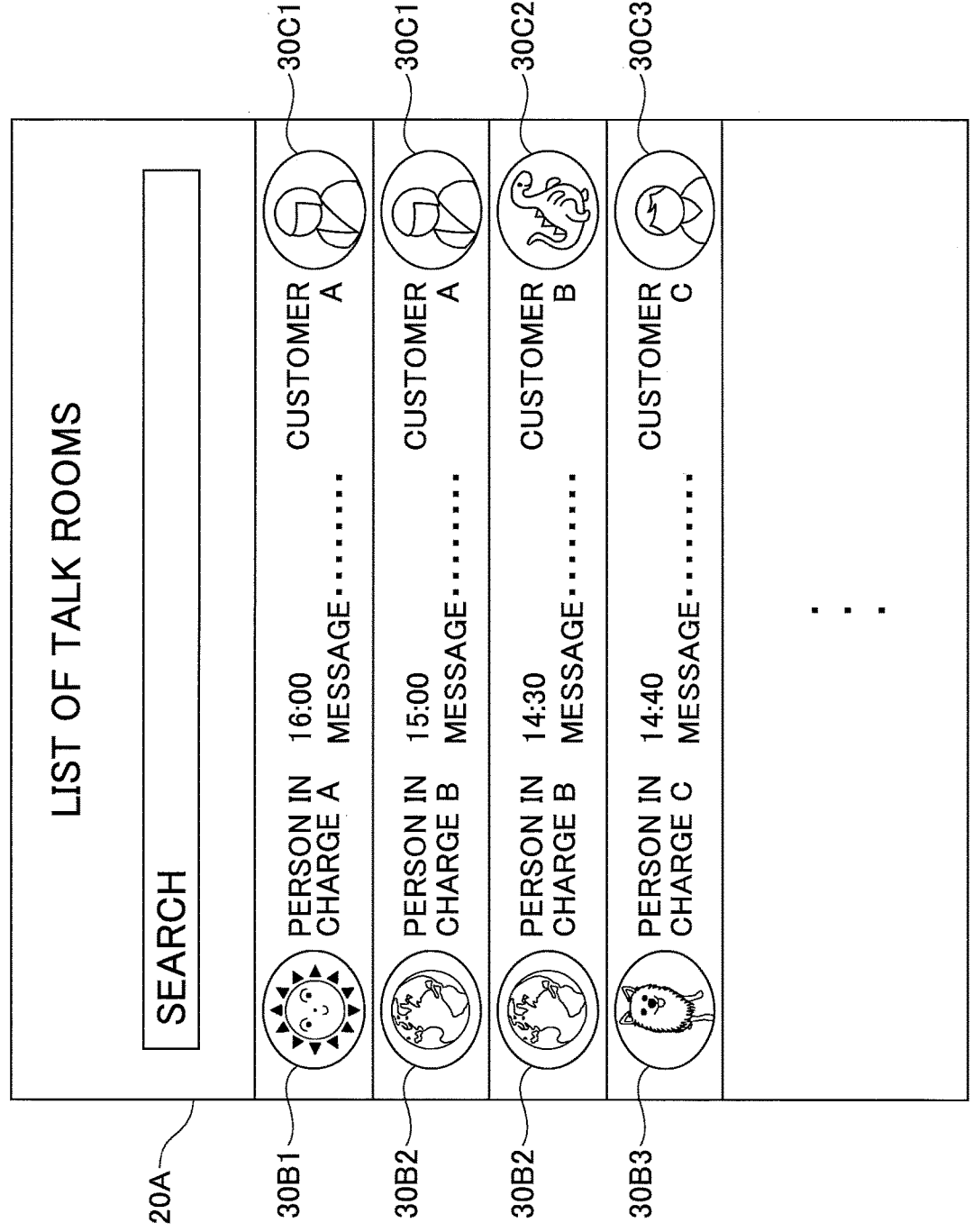

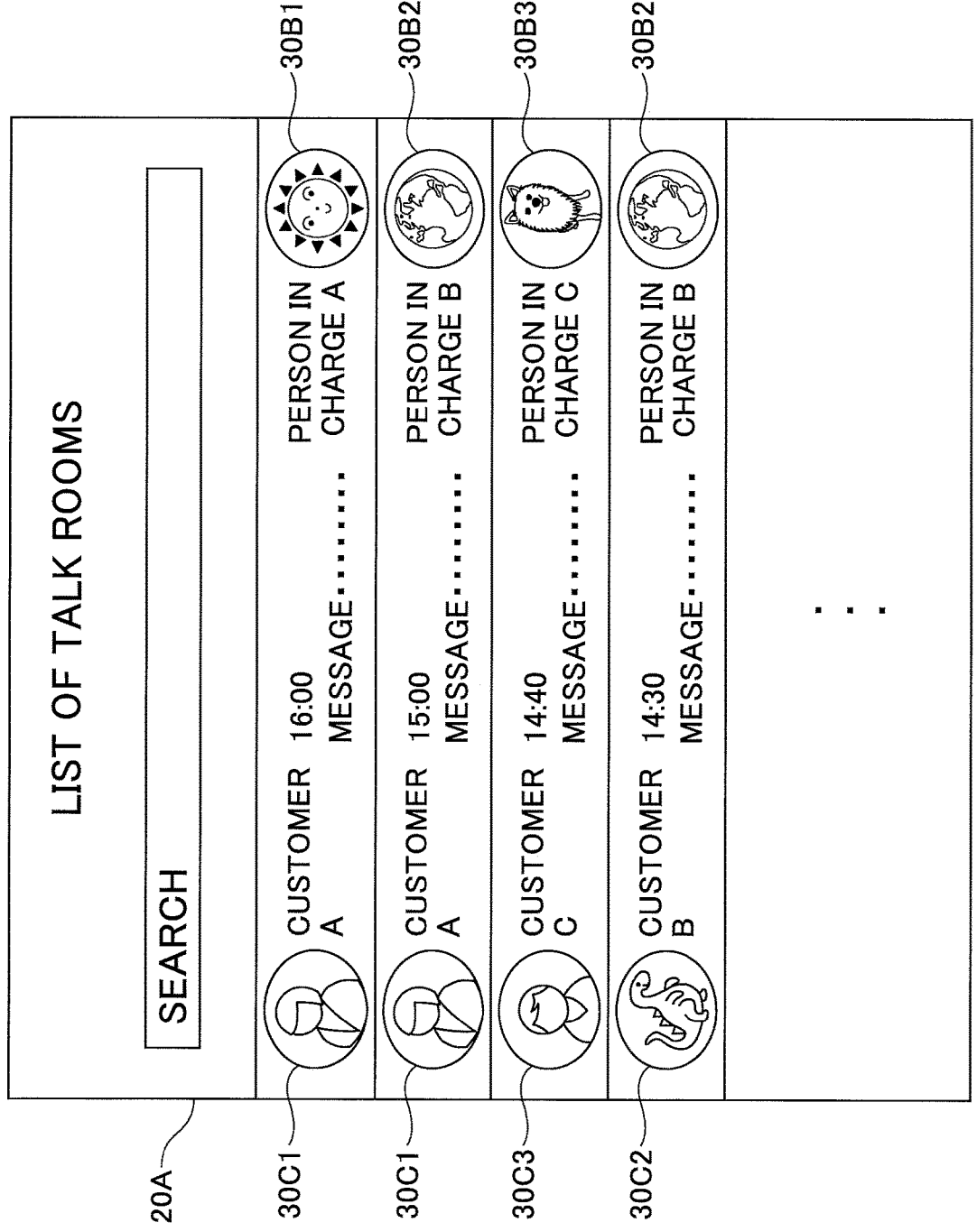

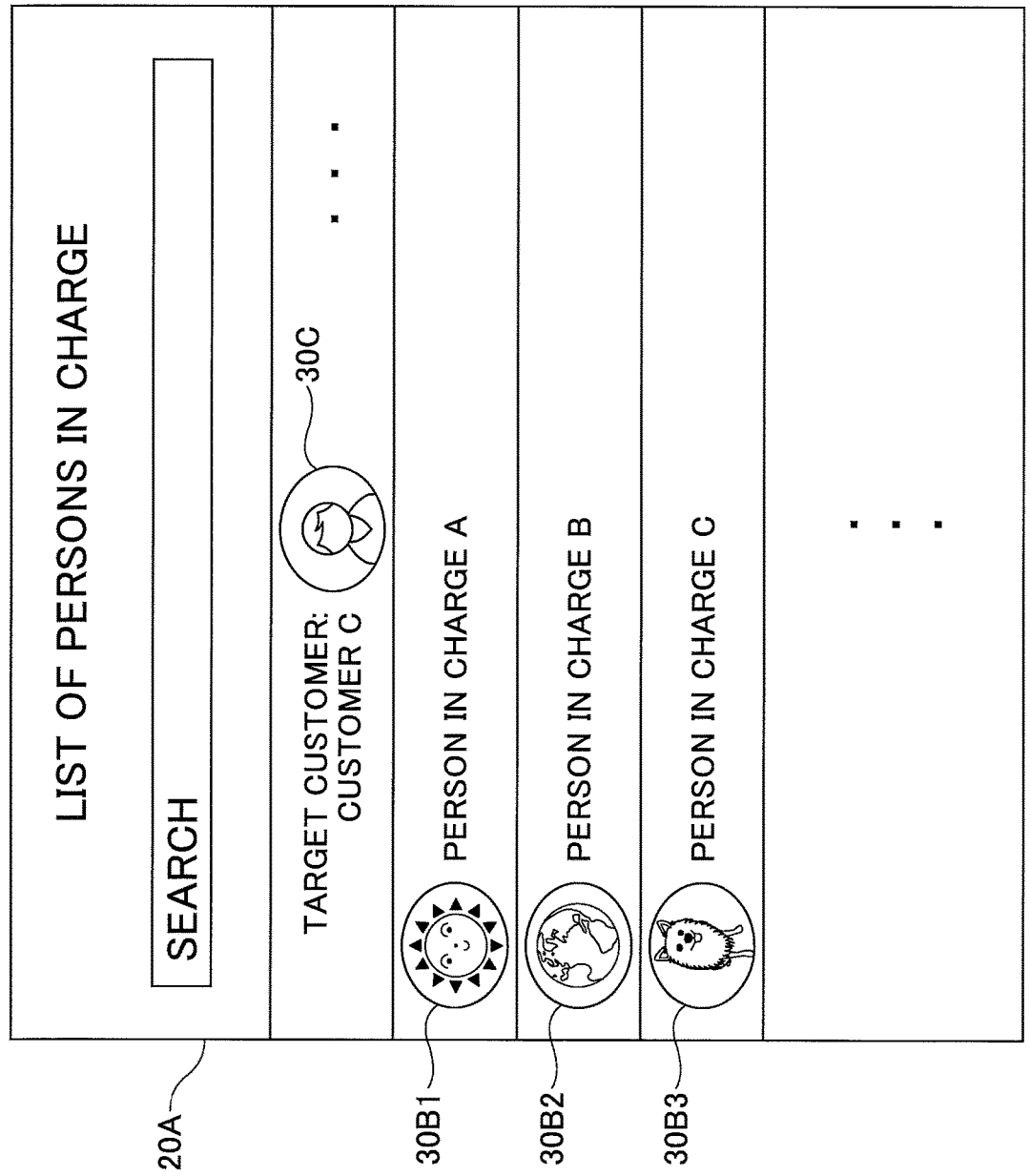

FIG.24

| MANAGEMENT MENU | | | | | | | | | XXX HAIR SALON |
|---|---|---|---|---|---|---|---|---|---|
| TALK ROOM MENU | MESSAGE FROM MS. YY YY: I AM SENDING YOU IMAGE PHOTOGRAPHS OF A DESIRED HAIRCUT IN ADVANCE. [PHOTOGRAPH 1] [PHOTOGRAPH 2] | | | | | | | | |
| ▽ DECEMBER 12 (THU) △ | | | | | | | | | |
| HIDE TOTAL FIELD ☒ | 10:00 | 11:00 | 12:00 | 13:00 | 14:00 | 15:00 | 16:00 | | |
| NUMBER OF RESERVATIONS | 2 | 4 | 2 | 4 | 1 | 5 | 4 | | |
| REMAINING NUMBER OF ACCEPTABLE RESERVATIONS | 4 | 2 | 4 | 2 | 6 ○ | 4 | 2 | | |
| | | | | | 2 | 1 | 2 | | |
| | | | | | 3 | 4 | 2 | | |
| PERSON IN CHARGE B1 | MS. AA AA [TALK ROOM MENU]—75 | | MS. BB BB | | MS. CC CC | | MS. D | | |
| PERSON IN CHARGE B2 | VACATION —77 | MS. YY YY [TALK ROOM MENU]—75A | MS. FF FF | | | MS. EE EE | | | |
| PERSON IN CHARGE B3 | MS. HH HH | | | MS. II II | | | MS. GG GG | | |
| PERSON IN CHARGE B4 | | MS. LL LL | [TALK ROOM MENU]—75 | | MS. MM MM | MS. KK KK | MS. J | | |
| | | | | | | | MS. NN NN | | |

COMMUNICATION CONTROL METHOD AND INFORMATION PROCESSING
APPARATUS

BACKGROUND OF THE INVENTION

1. Field of the Invention

The Present Invention Relates to a communication control method and an information processing apparatus.

2. Description of the Related Art

Sales activities performed by using a messenger function of SNS (Social Network Service), e-mails, etc., are becoming popular. Usage of a messenger function, etc., is advantageous in that messages can be directly sent to a terminal such as a smartphone of a customer.

When using a messenger function of SNS, etc., by sending messages from the terminal of a salesperson having a relationship with a customer, it is possible to communicate closely with the customer. Therefore, it is preferable that messages having the salesperson as the transmission source, are sent from the terminal of the salesperson, to the terminal of the customer. In this case, the message from the organization to which the salesperson belongs, is first transferred to the terminal of the salesperson, and then sent from the terminal of the salesperson to the terminal of the customer.

Methods by which the salesperson uses different transmission source information items for mails, etc., by using disclosed addresses, are implemented (for example, Patent Document 1); however, the purpose of these mechanisms is to have different transmission source information items displayed at the recipients of messages. Thus, even when these methods are applied, messages need to be sent from the terminal of the salesperson.

Patent Document 1: Japanese Laid-Open Patent Publication No. 2005-157952

As described above, by using a messenger function of SNS, etc., it is possible to communicate closely with the customer, and therefore the messages are preferably sent as messages from the salesperson, to the terminal of the customer.

However, when all messages relevant to sales activities of a store, etc., are sent via the terminal of the salesperson, it may be difficult to send the messages in a timely manner to the terminals of the customers, depending on the working status of the salesperson.

SUMMARY OF THE INVENTION

The present invention provides a communication control method and an information processing apparatus in which one or more of the above-described disadvantages are eliminated.

According to an aspect of the present invention, there is provided a communication control method for performing a process executed by a computer including a processor, the process including storing, in a storage device of an information processing apparatus, a correspondence relationship of a first user, a second user associated with the first user, and a third user associated with the second user; receiving, at the information processing apparatus, a message from the first user to the third user, from a terminal of the first user; and sending, by the information processing apparatus, the message received from the terminal of the first user as a message from the second user, to a terminal of the third user.

According to an aspect of the present invention, there is provided an information processing apparatus including a processor configured to execute a process including storing, in a storage device, a correspondence relationship of a first user, a second user associated with the first user, and a third user associated with the second user; receiving a message from the first user to the third user, from a terminal of the first user; and sending the message received from the terminal of the first user as a message from the second user, to a terminal of the third user.

According to an aspect of the present invention, there is provided a non-transitory computer-readable recording medium storing a program that causes a computer including a processor to execute a process performed in an information processing apparatus, the process including storing, in a storage device, a correspondence relationship of a first user, a second user associated with the first user, and a third user associated with the second user; receiving a message from the first user to the third user, from a terminal of the first user; and sending the message received from the terminal of the first user as a message from the second user, to a terminal of the third user.

BRIEF DESCRIPTION OF THE DRAWINGS

Other objects, features and advantages of the present invention will become more apparent from the following detailed description when read in conjunction with the accompanying drawings, in which:

FIGS. 6A and 6B illustrate examples of a correspondence relationship management table and a user attribute management table according to the first embodiment;

FIG. 7 illustrates an example of a state management table according to the first embodiment;

FIG. 8 illustrates an example of a message management table according to the first embodiment;

FIG. 11 illustrates an example of operation procedures according to the first embodiment (part 2);

FIGS. 12A and 12B illustrate an example of operation procedures according to the first embodiment (part 3);

FIG. 13 illustrates an example of operation procedures according to the first embodiment (part 4);

FIG. 14 illustrates an example of operation procedures according to the first embodiment (part 5);

FIG. 16 illustrates an example of operation procedures according to the first embodiment (part 7);

FIGS. 17A through 17C illustrate an example of operation procedures according to the first embodiment (part 8);

FIG. 21 illustrates an example of a screen display of the terminal according to the first embodiment (part 2);

FIGS. 22A and 22B illustrate examples of screen displays of the terminal according to the first embodiment (part 3);

FIG. 23 illustrates an example of a screen display of the terminal according to the first embodiment (part 4); and FIG. 24 illustrates an example of a screen display of the terminal according to the first embodiment (part 5).

DETAILED DESCRIPTION OF THE PREFERRED EMBODIMENTS

First Embodiment

<Overview>

Figure 1:
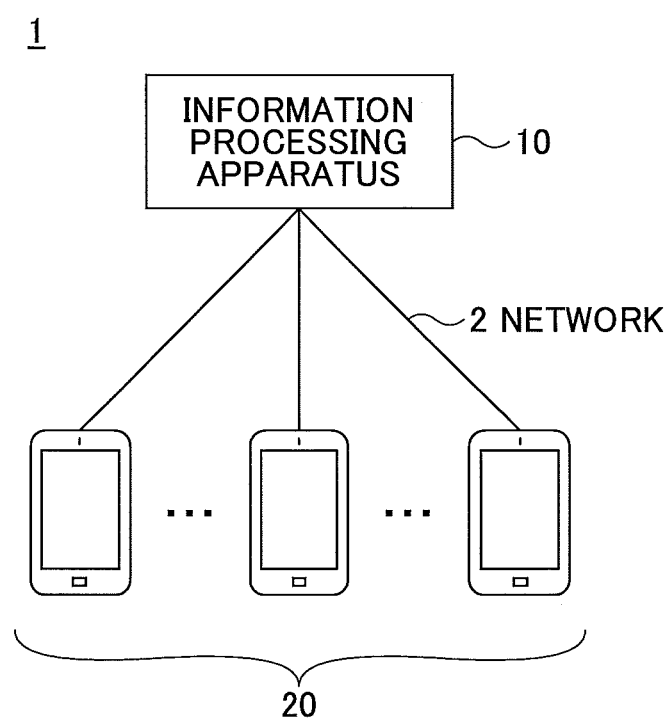
FIG. 1 illustrates an example of a system configuration of an information processing system according to a first embodiment.

FIG. 1 illustrates an example of a system configuration of an information processing system 1 according to a first embodiment. The information processing system 1 includes an information processing apparatus 10 and a plurality of terminals 20. The information processing apparatus 10 and the terminals 20 are connected via a network 2. The network 2 includes a wired network and a wireless network.

The information processing apparatus 10 is realized by, for example, a server. The terminal 20 is a smartphone, a tablet terminal, a PC (Personal Computer), a mobile phone, a game console, a touch pad, an electronic book reader, a wearable terminal, etc.

The information processing apparatus 10 provides SNS (Social Network Service) to the users of the terminals 20. By installing an application of SNS in the terminal 20 and connecting to the information processing apparatus 10, the user of the terminal 20 is able to receive SNS provided from the information processing apparatus 10.

Note that in the following embodiment, a case of using a service of exchanging chat messages among users of SNS (chat service) is mainly described; however, the present embodiment is also applicable to a case of sending and receiving e-mails among users. Furthermore, the messages sent and received in the chat service include stamps, image data, video data, etc., other than text messages.

The terminal 20 may receive SNS by using a web browser, etc., and connecting to the information processing apparatus 10.

The information processing apparatus 10 provides a chat service, etc., among users of SNS.

Figure 2A:
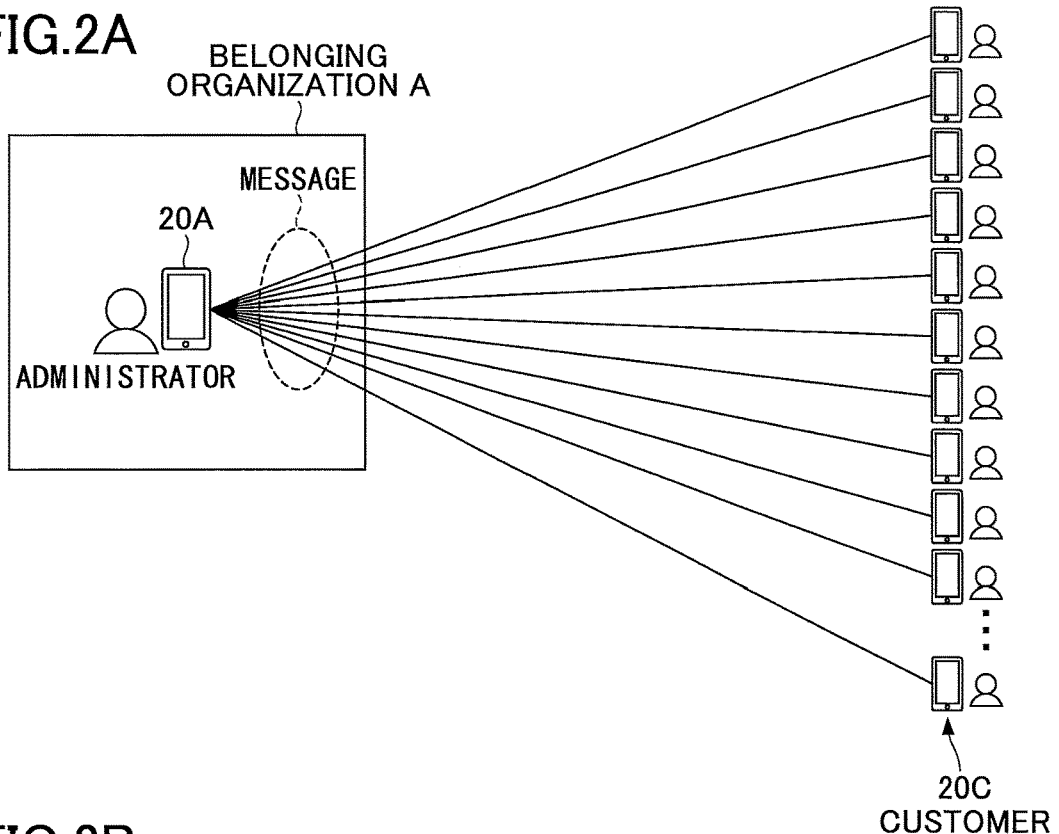
FIGS. 2A and 2B are for describing the relationship of an administrator, a person in charge, and a customer according to the first embodiment.
Figure 2B:
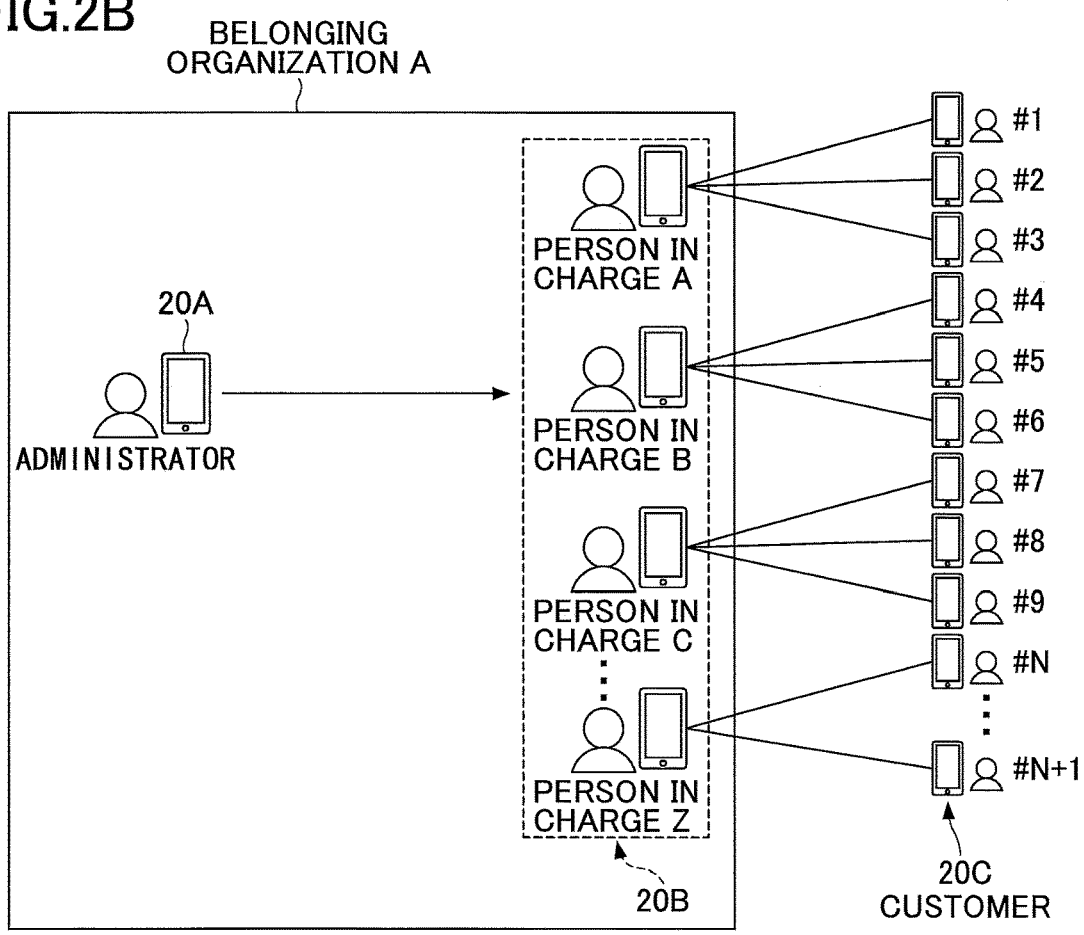

With reference to FIGS. 2A and 2B, a description is given of the overview of the first embodiment. FIGS. 2A and 2B are for describing the relationship of an administrator, a person in charge, and a customer according to the first embodiment.

In the following, the description is continued assuming that the terminal of the administrator is the terminal 20A, the terminal of the person in charge is the terminal 20B, and the terminal of the customer is the terminal 20C. When reference is made to a terminal 20, the description is relevant to a mode that is common to the terminal 20A, the terminal 20B, and the terminal 20C.

FIG. 2A illustrates messages being sent to customers according to a comparative example. In the comparative example, an administrator belonging to an organization A uses the terminal 20A to send a message relevant to sales activities of the organization A, to the terminals 20C of the customers. A message relevant to sales activities is, for example, information regarding the opening hours of a store, an introduction of an article, a coupon that can be used at the store, etc.

The information processing apparatus 10 manages the correspondence relationship of the administrator and the customer, and the messages from the terminal 20A of the administrator are sent to the terminals 20C of the customers, via the information processing apparatus 10. In the comparative example, the administrator needs to send messages to the terminals 20C of all customers, and therefore the load of the administrator is high. Furthermore, in the case of a job type of constructing a close relationship with the customer and proposing a service, such as a hair salon, a real estate agency, a car dealer, a dealer of financial products, etc., it has been difficult to provide services having high added value.

FIG. 2B illustrates messages being sent to customers according to the first embodiment. In the first embodiment, the transmission source of a message from the terminal 20A of the administrator to the customer, is changed to the person in charge, and is then sent to the terminal 20C of the customer.

The correspondence relationship of the administrator, the person in charge, and the customer as illustrated in FIG. 2B, is stored and managed in the information processing apparatus 10 (see FIG. 1). For example, the correspondence relationship of an administrator A, a person in charge A, and a customer #1, a customer #2, and a customer #3 is stored in the information processing apparatus 10. Furthermore, for example, the correspondence relationship of an administrator A, a person in charge B, and a customer #4, a customer #5, and a customer #6 is stored in the information processing apparatus 10.

Various messages relevant to sales activities of an organization to which the person in charge belongs, are sent from the terminal 20B of the person in charge to the terminal 20C of the customer via the information processing apparatus 10. Furthermore, messages from the administrator A to the customer are sent from the terminal 20A of the administrator to the terminal 20C of the customer via the information processing apparatus 10.

In this case, when the information processing apparatus 10 receives a message from the terminal 20A of the administrator, the information processing apparatus 10 changes the information of the transmission source to the person in charge corresponding to the customer using the terminal 20C that is the transmission destination, and sends the message to the terminal 20C. For example, the information processing apparatus 10 changes the information of the transmission source of a message addressed to a customer # N, from the administrator A to the person in charge Z, and sends the message for which the information of the transmission source has been changed, to the terminal 20C. Accordingly, it is possible to send messages relevant to sales activities in a timely manner, with the person in charge set as the transmission source of the messages.

When changing the information of the transmission source of a message, the information processing apparatus 10 may query the terminal 20B of the person in charge as to whether the change can be made. Accordingly, it is possible to prevent a situation where a message that is not confirmed by the person in charge is distributed to terminals 20C of customers.

Furthermore, in a case where the correspondence relationship of the administrator, the person in charge, and the customer is stored in the information processing apparatus 10, when the information processing apparatus 10 receives, from the terminal 20A of the administrator, a request to view messages sent and received between a person in charge and a customer, the information processing apparatus 10 displays the requested messages at the terminal 20A. Accordingly, the administrator is able to recognize how the person in charge is handling a customer.

<Hardware Configuration>

Next, the hardware configurations of the devices included in the information processing system 1 are described.

(1) Information Processing Apparatus

Figure 3:
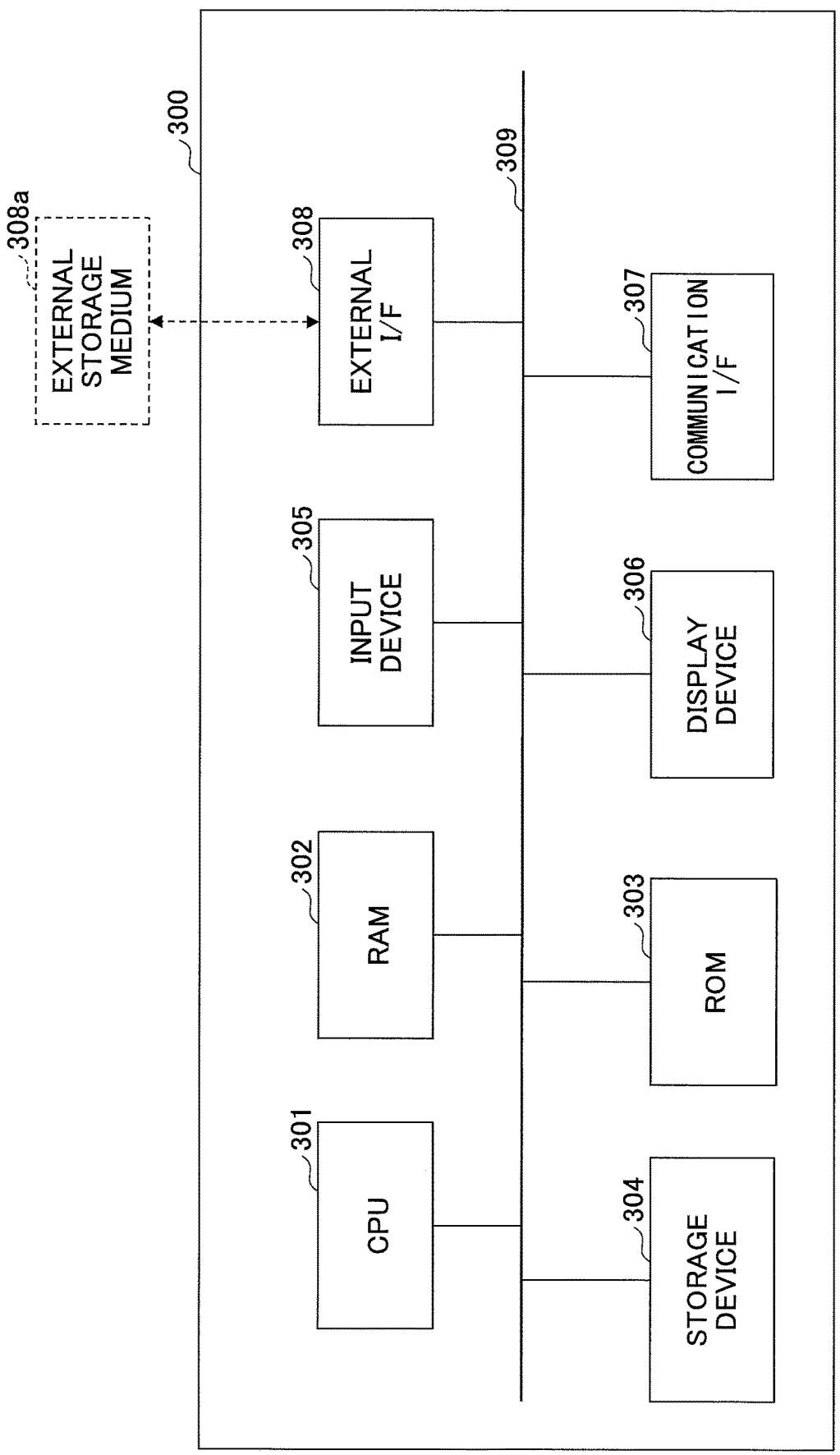
FIG. 3 illustrates an example of a hardware configuration of a computer according to the first embodiment.

The information processing apparatus 10 has a configuration of a general computer. FIG. 3 illustrates an example of a hardware configuration of a computer according to the first embodiment. In FIG. 3, a computer 300 includes, for example, a CPU (Central Processing Unit) 301, a RAM (Random Access Memory) 302, a ROM (Read-Only Memory) 303, a storage device 304, an input device 305, a display device 306, a communication I/F (Interface) 307, an external I/F 308, a bus 309, etc.

The CPU 301 is an arithmetic device for implementing control and functions of the computer 300, by loading programs and data from a memory such as the ROM 303 and the storage device 304 in to the RAM 302, and executing processes. The ROM 303 stores programs and data, such as BIOS (Basic Input/Output System) that is executed when the computer 300 is activated, settings of OS (Operating System), various settings, etc. The RAM 302 is a volatile memory for temporarily holding programs and data. The storage device 304 is a high-capacity storage device storing programs and data.

The input device 305 is, for example, a keyboard, a mouse, etc., which is used by the user for inputting various operation signals. The display device 306 is, for example, a display, etc., and displays processing results by the computer 300. Note that the input device 305 and/or the display device 306 may have a mode of being connected and used according to need.

The communication I/F 307 is an interface that connects the computer 300 to the network 2. The external I/F 308 is an interface between the computer 300 and an external device. An example of the external device is an external storage medium 308a. Accordingly, the computer 300 is able to read and/or write in the external storage medium 308a via the external I/F 308. Examples of the external storage medium 308a are various optical disks, various memory cards, etc.

The CPU 301 can realize the functions of the information processing apparatus 10 by executing programs stored in the ROM 303, etc.

(2) Terminal

Figure 4:
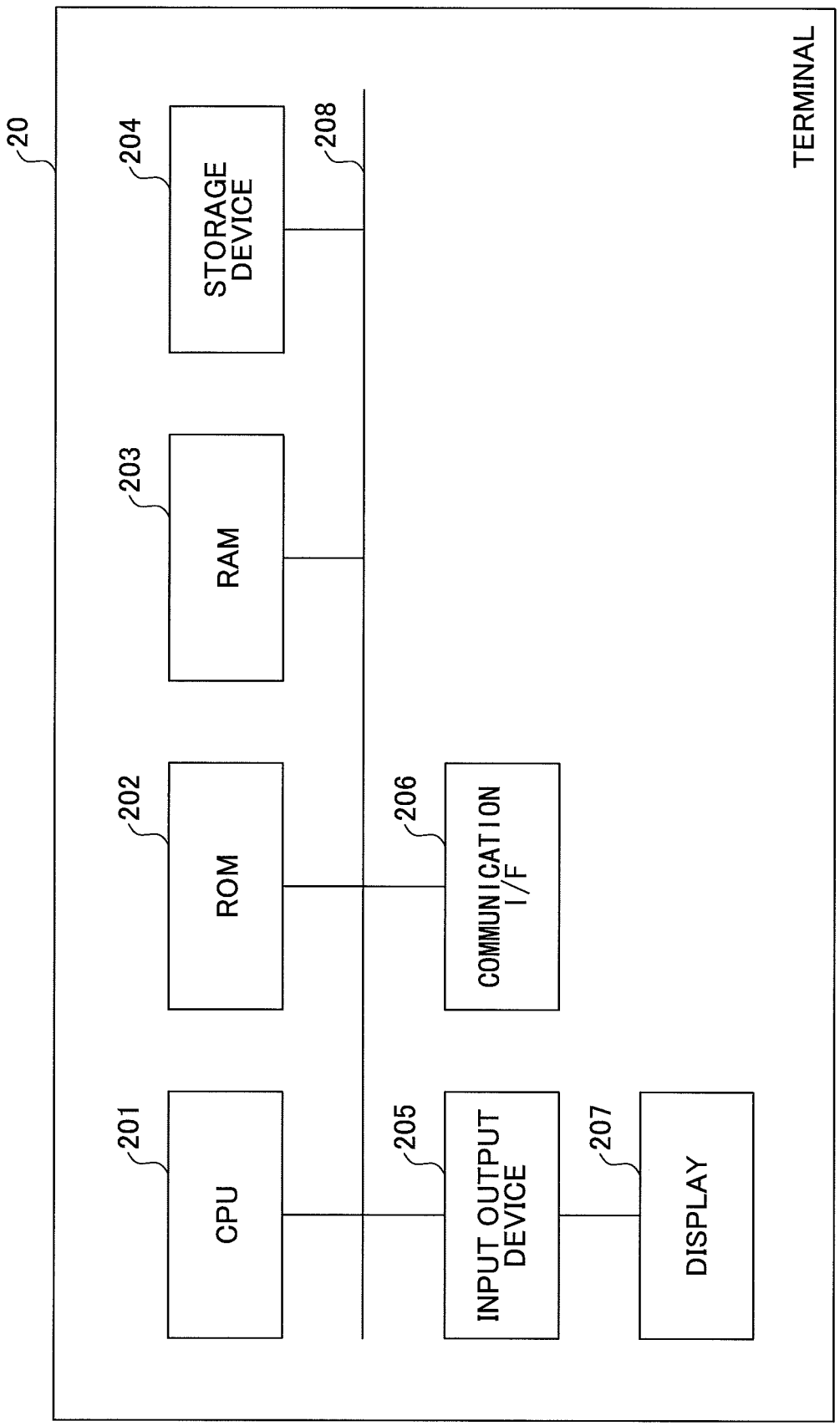
FIG. 4 illustrates an example of a hardware configuration of a terminal according to the first embodiment.

FIG. 4 illustrates an example of a hardware configuration of the terminal 20 according to the first embodiment.

The terminal 20 includes a CPU 201, a ROM 202, a RAM 203, a storage device 204, an input output device 205, a communication I/F 206, and a display 207 (display device). Note that the hardware elements of the terminal 20 are connected to each other via a bus 208.

The storage device 204 stores various programs. The CPU 201 is a computer for executing various programs stored in the storage device 204.

The ROM 202 is a non-volatile memory. The ROM 202 stores various programs, data, etc., needed for the CPU 201 to execute various programs stored in the storage device 204.

The RAM 203 is a main storage such as a DRAM (Dynamic Random Access Memory), a SRAM (Static Random Access Memory), etc. The RAM 203 functions as a work area that is expanded when various programs are executed by the CPU 201.

The input output device 205 includes functions of an input device for inputting various instructions to the terminal 20 and an output device for outputting processing results processed by the terminal 20. The input output device 205 is connected to a display 207. In the present embodiment, the display 207 may be a touch reactive display (touch panel). The communication I/F 206 performs communication between the terminal 20 and the information processing apparatus 10 via the network 2.

The CPU 201 can realize the functions of the terminal 20 by executing programs stored in the storage device 204, etc.

<Functional Configuration>

(1) Functional Configuration of Information Processing Apparatus

Figure 5:
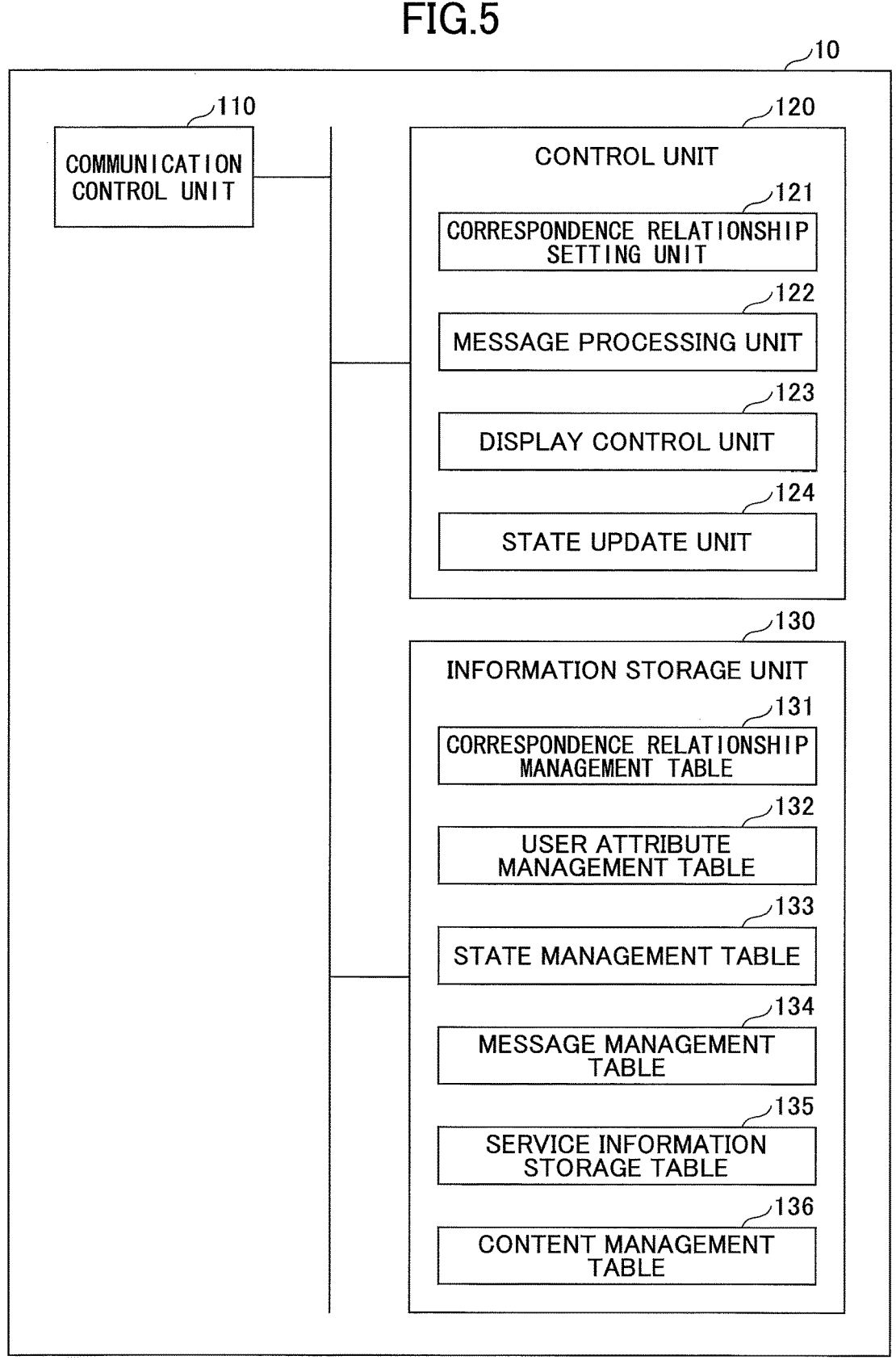
FIG. 5 illustrates an example of a functional configuration of an information processing apparatus according to the first embodiment.

With reference to FIG. 5, a description is given of the functional configuration of the information processing apparatus 10. FIG. 5 illustrates an example of a functional configuration of the information processing apparatus 10 according to the first embodiment. The information processing apparatus 10 includes a communication control unit 110, a control unit 120, and an information storage unit 130. The control unit 120 includes a correspondence relationship setting unit 121, a message processing unit 122, a display control unit 123, and a state update unit 124. Furthermore, the information storage unit 130 includes a correspondence relationship management table 131, a user attribute management table 132, a state management table 133, a message management table 134, a service information storage table 135, and a content management table 136.

The communication control unit 110 receives various signals such as messages, requests for association, etc., from the terminal 20. Furthermore, the communication control unit 110 sends various signals such as messages, queries, etc., to the terminal 20, upon receiving instructions from the control unit 120.

The control unit 120 executes various control operations with respect to the functions of the information processing apparatus 10.

The correspondence relationship setting unit 121 registers a correspondence relationship in the correspondence relationship management table 131, in response to the communication control unit 110 receiving a request to set a correspondence relationship of the "administrator", the "person in charge", and the "customer", from the terminal 20. When a request for association is received, the correspondence relationship setting unit 121 may query the user of the terminal 20, who is to be associated, as to whether the setting of the correspondence relationship can be executed. For example, the terminal 20B of the person in charge may query the terminal 20A of the administrator who is to be associated, as to whether the setting of the correspondence relationship may be executed, when the request for association is received.

The correspondence relationship setting unit 121 determines whether the attribute of the user of the terminal 20 is "administrator", "person in charge", or "customer", by referring to the user attribute management table 132.

The correspondence relationship setting unit 121 deletes the correspondence relationship stored in the correspondence relationship management table 131, in response to the communication control unit 110 receiving a request to delete the setting of the correspondence relationship of the "administrator", the "person in charge", and the "customer", from the terminal 20. When the correspondence relationship is deleted, messages sent and received with the customer cannot be viewed from the terminal 20B of the person in charge.

When the communication control unit 110 receives a message from the terminal 20A of the administrator, the message processing unit 122 stores the message in the message management table 134. Specifically, the transmission source, the destination, the transmission reception time and date, and the message content are stored in the message management table 134.

The message processing unit 122 refers to the correspondence relationship management table 131, and changes the information of the transmission source of the message, according to the transmission destination of the message. For example, when a message addressed to a customer #1 is received from an administrator A, the message processing unit 122 refers to the correspondence relationship management table 131, identifies that the person in charge B is the person in charge associated with the customer #1, and sets the information of the person in charge B in the information of the transmission source of the message. The information of the transmission source is, for example, the user identifier, the user name, the mail address, etc., of the person in charge B.

The message processing unit 122 instructs the communication control unit 110 to send the message for which the information of the transmission source has been changed, to the terminal 20 of the user that is the destination.

The display control unit 123 determines whether it is acceptable to allow the terminal 20A of the administrator to view the transmission reception status of messages of a specified person in charge, in response to the communication control unit 110 receiving a request to view messages of the person in charge, from the terminal 20A of the administrator. The display control unit 123 refers to the correspondence relationship management table 131, and when the administrator and the person in charge are associated with each other, the display control unit 123 determines that it is acceptable to allow the administrator to view the transmission reception status of messages.

When the display control unit 123 determines that it is acceptable to allow the administrator to view the transmission reception status of messages, the display control unit 123 causes the terminal 20A of the administrator to display the transmission reception status of messages.

The state update unit 124 updates the state of the person in charge being managed in the state management table 133, in response to the communication control unit 110 accepting a report of the state of the person in charge, from the terminal 20B of the person in charge. The state update unit 124 instructs the communication control unit 110 to report the updated state to the terminal 20A of the administrator.

Here, the "state" is the state of the person in charge, such as "on duty", "on break", "on vacation", etc. When the person in charge is in a state of being unable to respond to messages from a client, the state update unit 124 may make a setting such that the terminal 20A of the administrator responds to the messages on behalf of the person in charge. Furthermore, the state update unit 124 may make a setting such that another person in charge responds on behalf of the unavailable person in charge. In this case, the state update unit 124 stores a setting of the substitution in the state management table 133, in response to the communication control unit 110 receiving a substitution setting request from the terminal 20A of the administrator. The substitution setting request includes the identifier of the substitute person in charge. The state update unit 124 reports this setting to the terminal 20 of the person who has been set as the substitute person in charge, via the communication control unit 110.

The information storage unit 130 stores various kinds of information according to instructions from the control unit 120. Furthermore, the information storage unit 130 updates various kinds of information according to instructions from the control unit 120.

(2) Tables Stored at Information Processing Apparatus

The information storage unit 130 stores the correspondence relationship management table 131, the user attribute management table 132, the state management table 133, the message management table 134, the service information storage table 135, and the content management table 136. The information elements stored in the tables are described with reference to FIGS. 6A through 8.

FIG. 6A illustrates an example of a correspondence relationship management table 131 according to the first embodiment. As illustrated in FIG. 6A, the correspondence relationship management table 131 manages the identifier of the administrator, the identifier of the person in charge, and the identifier of the customer, in association with each other. An identifier is, for example, a user name, etc., in SNS. The correspondence relationship management table 131 registers, updates, and deletes a correspondence relationship, upon receiving an instruction from the correspondence relationship setting unit 121. In the example of FIG. 6A, one administrator is registered; however, a plurality of administrators may be registered.

FIG. 6B illustrates an example of a user attribute management table 132 according to the first embodiment. As illustrated in FIG. 6B, the user attribute management table 132 manages the identifier of a user, the attribute of the user, and the organization to which the user belongs, in association with each other. As the attribute of the user, any one of "administrator", "person in charge", and "general" is set. When the attribute of the user is "administrator" or "person in charge", the identifier of the organization to which the user belongs is set in the "belonging organization" field.

FIG. 7 illustrates an example of the state management table 133 according to the first embodiment. As illustrated in FIG. 7, the state management table 133 manages the identifier of a person in charge, the state of the person in charge, and the substitute person in charge, in association with each other. In response to the state update unit 124 receiving a state from the terminal 20B of the person in charge, via the communication control unit 110, values are set in the field of the "person in charge" and the field of the "state of the person in charge". In response to the state update unit 124 receiving a substitute setting request via the communication control unit 110, the state update unit 124 sets the identifier of the substitute person in charge, in the field of "substitute person in charge", in the state management table 133.

FIG. 8 illustrates an example of the message management table 134 according to the first embodiment. As illustrated in FIG. 8, in the message management table 134, messages transmitted and received with customers are recorded, for each person in charge. In the field of the customer, an identifier of the customer associated with the person in charge is set. As the message ID, an identifier of the message sent and received with the customer, is set. As the transmission reception time and date, the time when the terminal 20B of the person in charge has sent the message or the time when the terminal 20B of the person in charge has received the message is set. In the field of the transmission source, the identifier of the transmission source of the message is stored.

As the content of the message, text, a stamp, a still image, a video, a combination of these items, etc., included in the message, are stored.

In the field of the transmission source, the identifier of a customer, the identifier of a person in charge, or the identifier of an administrator is set. With regard to a message having the administrator as the transmission source, the information of the transmission source is changed to information of a person in charge by the message processing unit 122; the message processing unit 122 can identify whether the message is sent from the terminal 20A of an administrator or the message is sent from the terminal 20B of a person in charge, by referring to the message management table 134.

In the service information storage table 135, information of the provided service content is stored, for each organization to which a user belongs. When a request to display the service content is received from the terminal 20, the display control unit 123 refers to the service information storage table 135, identifies the service content, and displays the service content on a screen of the specified terminal 20.

In the content management table 136, the contents that the customer, the person in charge, and the administrator are allowed to use, are stored. The content is stored in association with the identifier of the customer, the identifier of the person in charge, and the identifier of the administrator. The content is a stamp, a still image, a video, etc. The message processing unit 122 distributes the content to the specified address, upon receiving a request to distribute the content from the terminal 20. When the customer, the person in charge, and the administrator have a correspondence relationship, the message processing unit 122 may send a content that the administrator and the person in charge are allowed to use, to the terminal 20C of the customer.

(3) Terminal

Figure 9:
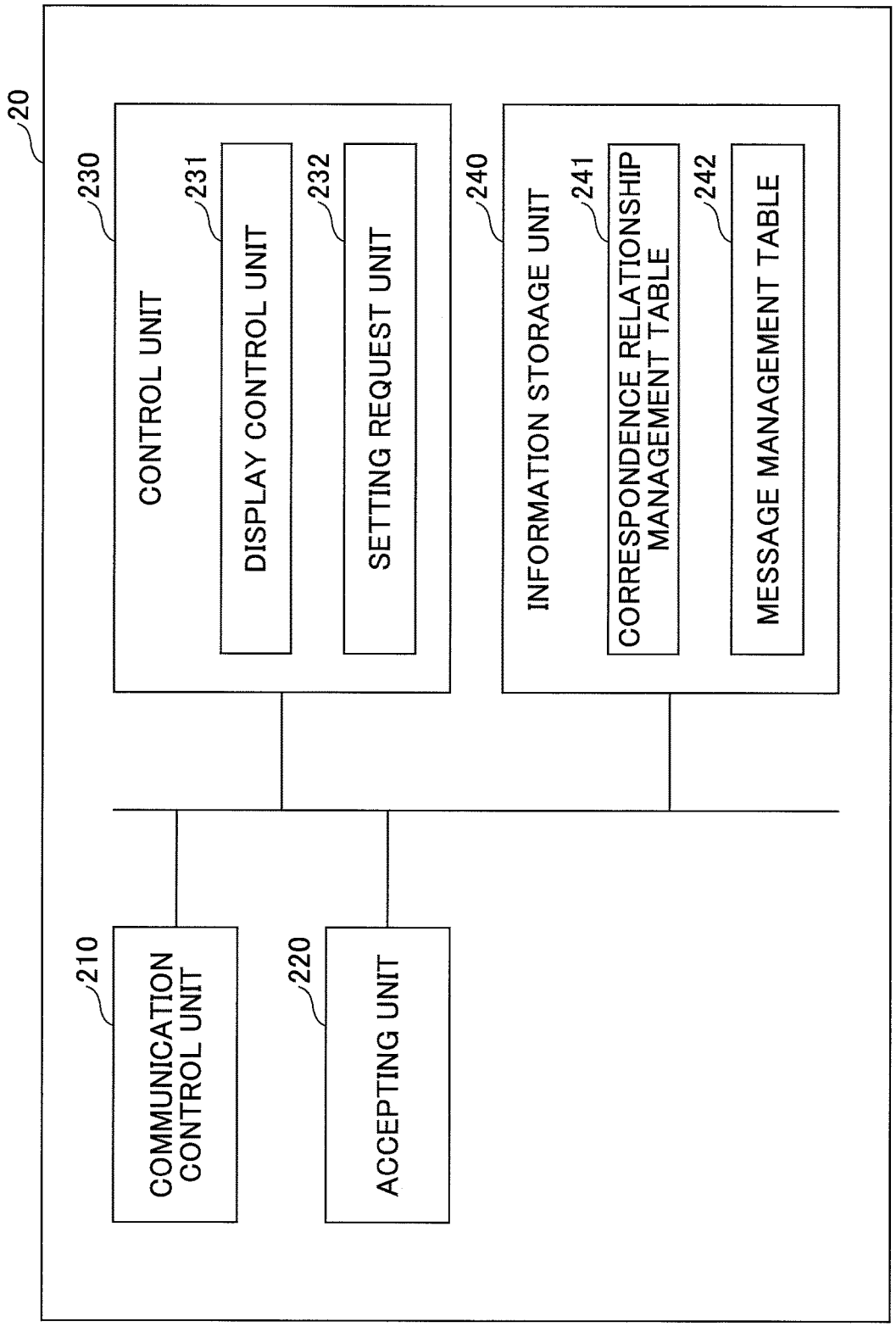
FIG. 9 illustrates an example of a functional configuration of the terminal according to the first embodiment.

With reference to FIG. 9, a description is given of the functional configuration of the terminal 20 according to the first embodiment. FIG. 9 illustrates an example of a functional configuration of the terminal 20 according to the first embodiment.

The terminal 20 includes a communication control unit 210, an accepting unit 220, a control unit 230, and an information storage unit 240. The control unit 230 includes a display control unit 231 and a setting request unit 232. The information storage unit 240 includes a correspondence relationship management table 241 and a message management table 242.

The communication control unit 210 receives a message to the user of the terminal 20 and various signals, from the information processing apparatus 10. Furthermore, the communication control unit 210 sends messages and various signals to the information processing apparatus 10, upon receiving instructions from the control unit 230.

The accepting unit 220 accepts input of messages and various instructions from the user to the terminal 20.

The control unit 230 controls the functions of the terminal 20. The display control unit 231 displays messages, etc., on the screen of the terminal 20. The setting request unit 232 instructs the communication control unit 210 to send, to the information processing apparatus 10, a setting request corresponding to a received instruction, in response to the accepting unit 220 accepting the instruction from the user. The setting request is, for example, a request to set a correspondence relationship of the administrator, the person in charge, and the customer, a substitute setting request, etc.

The information storage unit 240 stores various kinds of information upon receiving an instruction from the control unit 230. The correspondence relationship management table 241 and the message management table 242 are stored in the terminal 20, when the user of the terminal 20 is an administrator or a person in charge. The items managed in the correspondence relationship management table 241 and the message management table 242 are the same as the items managed in the correspondence relationship management table 131 and the message management table 134 of the information processing apparatus 10. In the case of the terminal 20B of a person in charge, information relevant to the person in charge who is the user of the terminal 20B, and information relevant to the administrator associated with the person in charge are stored. In the case of the terminal 20A of an administrator, information relevant to the administrator who is the user of the terminal 20A, and information relevant to the person in charge associated with the administrator are stored.

<Operation Procedures>

With reference to FIGS. 10 through 19, a description is given of operation procedures according to the first embodiment.

(1) Storage of Correspondence Relationship

Figure 10:
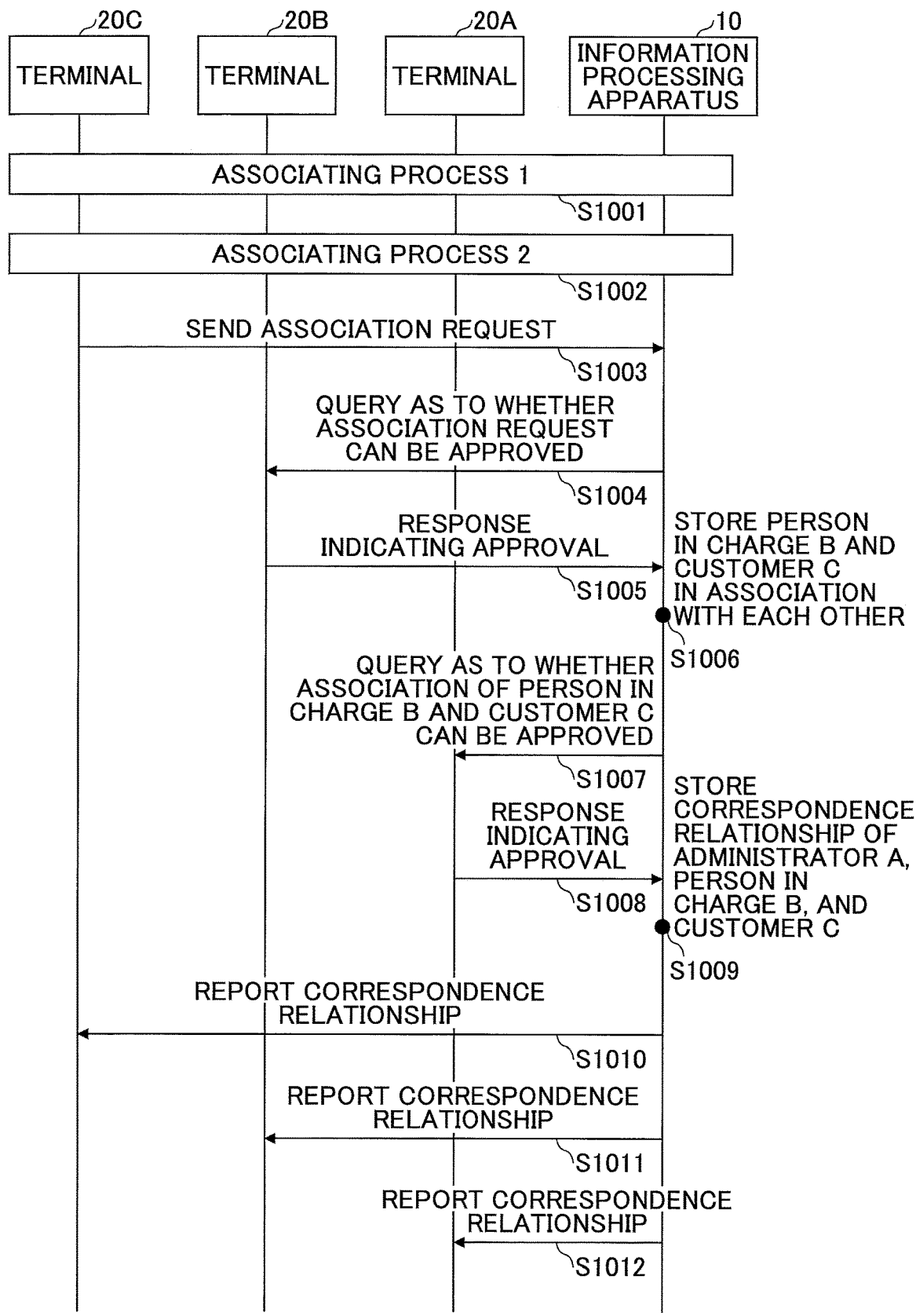
FIG. 10 illustrates an example of operation procedures according to the first embodiment (part 1)

With reference to FIG. 10, a description is given of operation procedures of storing a correspondence relationship of the terminal 20A of the administrator, the terminal 20B of the person in charge, and the terminal 20C of the customer. FIG. 10 illustrates an example of operation procedures according to the first embodiment (part 1).

In order to associate the terminal 20A of the administrator with the terminal 20B of the person in charge, either an associating process 1 or an associating process 2 is executed via the information processing apparatus 10. Here, the associating process 1 is a method of associating an administrator A with an person in charge B by having the terminal 20A of the administrator A generate a new identifier for a person in charge, and assigning the generated identifier to the person in charge B. The associating process 2 is a method of associating an administrator A with an person in charge B by having the terminal 20B of the person in charge B report the identifier that is already assigned to the person in charge B.

In step S1001, the associating process 1 is executed.

Specifically, in response to receiving a request to generate an identifier for a person in charge from the terminal 20A of the administrator A, the correspondence relationship setting unit 121 of the information processing apparatus 10 generates an identifier for a person in charge, and stores the generated identifier in association with the identifier of the administrator A. The correspondence relationship setting unit 121 sends information for assigning the generated identifier to the person in charge, to the terminal 20A of the administrator A or the terminal 20B of the person in charge B, via the communication control unit 110. The information for assigning the generated identifier to the person in charge is, for example, a QR Code®, a URL, etc., and as the terminal 20B of the person in charge B accesses this information, the identifier associated with the administrator A, is assigned to the person in charge B. When the identifier is assigned to the person in charge B, the correspondence relationship setting unit 121 stores the administrator A and the person in charge B in association with each other in the correspondence relationship management table 131. Here, the identifier assigned to the person in charge B may include a character string set by the administrator A. For example, information for identifying the organization to which the person in charge B belongs, such as a character string "ABC_Salon", etc., may be included.

In step S1002, the associating process 2 is executed.

Specifically, in response to receiving a request to associate the identifier of the person in charge B with the administrator A from the terminal 20B of the person in charge B, the correspondence relationship setting unit 121 of the information processing apparatus 10 queries the terminal 20A of the administrator A as to whether the association can be approved, via the communication control unit 110. When a response of approval is received, the correspondence relationship setting unit 121 stores the administrator A and the person in charge B in association with each other, in the correspondence relationship management table 131. Here, at the process of step S1002, a character string set by the administrator A may be added to the identifier of the person in charge B. For example, the character string to be added is information for identifying the organization to which the person in charge belongs.

In step S1003, in response to the accepting unit 220 of the terminal 20C of the customer C accepting an instruction from the customer C, the communication control unit 210 sends an association request for requesting the association with the person in charge B, to the information processing apparatus 10. The association request includes an identifier for identifying the customer C and the identifier identifying the person in charge B. The communication control unit 110 of the information processing apparatus 10 receives the association request.

In step S1004, the correspondence relationship setting unit 121 of the information processing apparatus 10 instructs the communication control unit 110 to send a signal of a query as to whether the association request can be approved, to the terminal 20B of the person in charge B. The communication control unit 110 sends a signal of a query as to whether the association request can be approved, to the terminal 20B of the person in charge B.

In step S1005, in response to receiving the signal of a query as to whether the association request can be approved, the setting request unit 232 of the terminal 20B of the person in charge B displays a message prompting to determine whether to approve the association request on a screen of the terminal 20B. In response to the accepting unit 220 accepting an input indicating approval, the setting request unit 232 instructs the communication control unit 210 to send a response indicating approval. The communication control unit 210 sends the response indicating approval to the information processing apparatus 10.

In step S1006, in response to the communication control unit 110 of the information processing apparatus 10 receiving the response indicating approval, the correspondence relationship setting unit 121 stores the person in charge B and the customer C in association with each other in the correspondence relationship management table 131.

In step S1007, the correspondence relationship setting unit 121 of the information processing apparatus 10 refers to the user attribute management table 132, and identifies the administrator of the organization to which the person in charge B belongs. Here, in the following, the description is continued assuming that the organization to which the person in charge B belongs is an organization A and that the administrator is an administrator A. The correspondence relationship setting unit 121 of the information processing apparatus 10 instructs the communication control unit 110 to send a signal of a query as to whether the association of the person in charge B and the user C can be approved, to the terminal 20A of the administrator A.

In step S1008, in response to the communication control unit 210 of the terminal 20A of the administrator A receiving the signal of a query as to whether the association can be approved, the setting request unit 232 displays a message prompting to determine whether to approve the association request on a screen of the terminal 20A. In response to the accepting unit 220 accepting an input indicating approval, the setting request unit 232 instructs the communication control unit 210 to send a response indicating approval. The communication control unit 210 sends a response indicating approval to the information processing apparatus 10.

In step S1009, in response to the communication control unit 110 of the information processing apparatus 10 receiving a response indicating approval, the correspondence relationship setting unit 121 stores the correspondence relationship of the administrator A, the person in charge B, and the customer C, in the correspondence relationship management table 131.

In step S1010, the correspondence relationship setting unit 121 of the information processing apparatus 10 reports that the correspondence relationship of the person in charge B and the customer C has been set, to the terminal 20C of the customer C via the communication control unit 110. In response to the communication control unit 110 of the terminal 20C of the customer C receiving the report, the setting request unit 232 stores the reported correspondence relationship in the correspondence relationship management table 241. Furthermore, the setting request unit 232 generates a talk room (talk room #1) that is chat group of the person in charge B and the customer C.

In step S1011, the correspondence relationship setting unit 121 of the information processing apparatus 10 reports that the correspondence relationship of the administrator A, the person in charge B, and the customer C has been set, to the terminal 20B of the person in charge B, via the communication control unit 110. In response to the communication control unit 110 of the terminal 20B of the person in charge B receiving the report, the setting request unit 232 stores the reported correspondence relationship in the correspondence relationship management table 241. Furthermore, similar to the terminal 20C, the setting request unit 232 generates a talk room (talk room #1) of the person in charge B and the customer C.

In step S1012, the correspondence relationship is reported to the terminal 20A of the administrator A similar to step S1009, and the correspondence relationship is stored and the talk room (talk room #1) is generated.

In the above operation procedures, the execution of the process of associating the administrator A, the person in charge B, and the customer C is triggered by receiving the association request from the terminal 20C of the customer C. However, the association process can be executed by the same operation procedures, also in the case of receiving an association request from the terminal 20B of the person in charge B, and in the case of receiving an association request from the terminal 20A of the administrator A.

When an association request is received from the terminal 20B of the person in charge B, a query as to whether the association can be approved is sent from the information processing apparatus 10 to the terminal 20A of the administrator A and the terminal 20C of the customer C. When approval is received from the terminal 20A and the terminal 20C, the correspondence relationship of the administrator A, the person in charge B, and the customer C is stored.

Furthermore, when an association request is received from the terminal 20A of the administrator A, a query as to whether the association can be approved is sent from the information processing apparatus 10 to the terminal 20B of the person in charge B and the terminal 20C of the customer C. When approval is received from the terminal 20B and the terminal 20C, the correspondence relationship of the administrator A, the person in charge B, and the customer C is stored.

(2) Transmission of Message from Terminal of Administrator

With reference to FIG. 11, a description is given of the procedures of sending a message from the terminal 20A of the administrator A to the terminal 20C of the customer C. FIG. 11 illustrates an example of operation procedures according to the first embodiment (part 2). The operation procedures of FIG. 11 are executed by using the talk room #1 generated by the operation procedures of FIG. 10.

In step S1101, in response to the accepting unit 220 of the terminal 20A of the administrator A accepting an input of a message to the customer C, the setting request unit 232 instructs the communication control unit 110 to send this message to the information processing apparatus 10. Upon receiving the instruction, the communication control unit 210 sends the message to the information processing apparatus 10. This message is, for example, a message relevant to sales activities of the organization A to which the administrator A belongs. An instruction to change the transmission source of the message to the person in charge of the customer C, may be sent together with the message.

In step S1102, in response to the communication control unit 110 of the information processing apparatus 10 receiving the message, the message processing unit 122 refers to the correspondence relationship management table 131, and identifies the person in charge associated with the administrator A and the customer C. Here, in the following, the description is continued assuming that the person in charge B is identified.

In step S1103, the message processing unit 122 of the information processing apparatus 10 instructs the communication control unit 110 to send a signal of a query as to whether information of the transmission source of the message can be changed to the person in charge B. The communication control unit 110 sends a signal of a query to the terminal 20B of the person in charge B.

In step S1104, when the terminal 20B of the person in change B receives the signal of a query, the display control unit 231 displays a message prompting to determine "whether the information of the transmission source can be changed to the person in charge B", on the screen of the terminal 20B.

In step S1105, in response to the accepting unit 220 accepting input of "information can be changed" from the person in charge B, the setting request unit 232 instructs the communication control unit 210 to send a response indicating "information can be changed" to the information processing apparatus 10. The communication control unit 210 sends a response indicating "information can be changed" to the information processing apparatus 10.

In step S1106, in response to the communication control unit 110 of the information processing apparatus 10 receiving the response indicating "information can be changed", the message processing unit 122 changes the information of the transmission source of the message, to the person in charge B. Furthermore, the message processing unit 122 stores the information of the sent message in the message management table 134. Here, in the field of the transmission source, the user of the terminal 20A that has actually sent the message, i.e., the identifier of the administrator A, is set.

In step S1107, the message processing unit 122 instructs the communication control unit 110 to send the message, for which the information of the transmission source has been changed, to the terminal 20C of the customer C. Upon receiving the instruction, the communication control unit 110 sends the message, for which the information of the transmission source has been changed, to the terminal 20C of the customer C. Here, the message processing unit 122 may send a signal instructing the display mode of this message, together with the message, to the terminal 20C of the customer C.

In step S1108, when the communication control unit 210 of the terminal 20C of the customer C receives the message, the display control unit 231 displays the received message on the screen of the terminal 20C. When the signal instructing the display mode of the message is received, the display control unit 231 displays the message on the screen of the terminal 20C in the display mode according to the instruction.

Here, the instruction of the display mode of the message is, for example, an instruction to display the message in a different display mode than the message sent from the terminal 20B of the person in charge B. Accordingly, it is possible for the customer C to distinguish between the message from the person in charge B and the message from the administrator A. Note that in order to prevent the customer C from distinguishing between the message from the person in charge B and the message from the administrator A, for example, when the customer C is to recognize the message from the administrator A as a message from the person in charge B, the display modes of the messages are not differentiated.

Note that in the operation procedures described above, the transmission source of the message is changed in response to accepting input of "information can be changed" from the person in charge B; however, the transmission source may be automatically changed without querying the terminal 20B of the person in charge B. In this case, the procedures of steps S1103 through S1105 are omitted.

(3) Simultaneous Distribution of Message

With reference to FIGS. 12A and 12B, a description is given of operation procedures relevant to the simultaneous distribution of a message. FIGS. 12A and 12B illustrate an example of operation procedures according to the first embodiment (part 3).

FIG. 12A illustrates operations performed when simultaneously distributing a message relevant to sales activities, for example, campaign information, etc., from the terminal 20A of the administrator A to the terminal 20 of a customer associated with the person in charge.

When sending a message from the terminal 20 of the administrator to the terminal 20 of the customer via the terminal 20 of the person in charge, in a case where the customer is stored in association with a plurality of persons in charge, the terminal 20 of the customer will receive the same message from a plurality of persons in charge, which is not preferable. Thus, in the operation procedures of FIG. 12A, transmission of redundant messages is avoided.

In step S1201, in response to the accepting unit 220 of the terminal 20A of the administrator A accepting input of a simultaneous distribution message to be simultaneously distributed to customers with whom the person in charge has a correspondence relationship, the communication control unit 210 sends the simultaneous distribution message to the information processing apparatus 10.

In step S1202, in response to the communication control unit 110 of the information processing apparatus 10 receiving the simultaneous distribution message, the message processing unit 122 refers to the correspondence relationship management table 131 and extracts the person in charge having a correspondence relationship with the customer C1, the customer C2, the customer C3, and the administrator A. Here, it is assumed that a person in charge B1 is extracted as the person in charge having a correspondence relationship with the customer C1, the customer C2, and the customer C3, and that a person in charge B2 is extracted as the person in charge having a correspondence relationship with the customer C1.

Because a plurality of persons in charge are associated with the customer C1, in order to avoid the simultaneous distribution message from being redundantly sent, a process of selecting the person in charge is executed.

In step S1203, the message processing unit 122 selects either one of the person in charge B1 or the person in charge B2 as the transmission source of the simultaneous distribution message addressed to the customer C1. For example, the message processing unit 122 may refer to the message management table 134, identify the person in charge who has performed transmission/reception of the newest message with the customer C1, and select the identified person in charge.

Furthermore, the message processing unit 122 may refer to the message management table 134, calculate the frequency of sending and receiving messages between the customer C1 and the person in charge B1 and the frequency of sending and receiving messages between the customer C1 and the person in charge B2 within a predetermined period, and select the person in charge having the higher frequency of sending and receiving messages.

Here, it is assumed that the person in charge B1 has been selected.

In step S1204, the message processing unit 122 of the information processing apparatus 10 instructs the communication control unit 110 to send a signal of a query as to whether the simultaneous distribution message addressed to the customer C1, the customer C2, and the customer C3 can be sent, and a signal of a query as to whether the information of the transmission source can be changed to the person in charge B1. The communication control unit 110 sends the signals of queries to the terminal 20B1 of the person in charge B1.

In step S1205, when the terminal 20B1 of the person in charge B1 receives the signals of queries, the display control unit 231 displays messages prompting to determine whether "can the simultaneous distribution message be sent to the customer C1, the customer C2, and the customer C3" and "can the information of the transmission source be changed to the person in charge B1", on the screen of the terminal 20B1.

In step S1206, in response to the accepting unit 220 accepting input indicating "the simultaneous distribution message can be sent to the customer C1, the customer C2, and the customer C3" and input indicating "the transmission source can be changed" from the person in charge B1, the setting request unit 232 instructs the communication control unit 210 to send these input contents as a response, to the information processing apparatus 10. The communication control unit 210 sends the response to the information processing apparatus 10. Here, the person in charge B1 may select the customers to be the transmission destinations of the simultaneous distribution message. For example, the person in charge B1 may not select a customer, who does not need the message to be delivered, as a destination.

In step S1207, in response to the communication control unit 110 of the information processing apparatus 10 receiving the response, the message processing unit 122 changes the information of the transmission source of the simultaneous distribution message addressed to the customer C1, the customer C2, and the customer C3, to the person in charge B1. Furthermore, the message processing unit 122 stores the information of the sent message, in the message management table 134. Here, in the field of the transmission source, the user of the terminal 20A that actually sent the message, i.e., the identifier of the administrator A, is set.

In step S1208, the message processing unit 122 instructs the communication control unit 110 to send the simultaneous distribution message, for which the information of the transmission source has been changed, to the terminal 20C1 of the customer C1. Upon receiving the instruction, the communication control unit 110 sends the simultaneous distribution message, for which the information of the transmission source has been changed, to the terminal 20C1 of the customer C1.

In step S1209, when the communication control unit 210 of the terminal 20C1 of the customer C1 receives the simultaneous distribution message, the display control unit 231 displays the received simultaneous distribution message on the screen of the terminal 20C1.

In steps S1210 through S1213, the same procedures as those of steps S1208 and S1209 are executed with respect to the terminal 20C2 of the customer C2 and the terminal 20C3 of the customer C3.

In FIG. 12A, a description is given of operation procedures in which the message sent from the terminal 20A of the administrator A is simultaneously distributed to the terminals 20C of the customers; however, a message sent from the terminal 20B of the person in charge may be simultaneously distributed. FIG. 12B illustrates operation procedures performed when simultaneously distributing a message sent from the terminal 20 of the person in charge.

In step S1220, in response to the accepting unit 220 of the terminal 20B1 of the person in charge B1 receiving input of a simultaneous distribution message with respect to a customer with whom the person in charge has a correspondence relationship, the communication control unit 210 sends the simultaneous distribution message to the information processing apparatus 10.

In step S1221, in response to the communication control unit 110 of the information processing apparatus 10 receiving the simultaneous distribution message, the message processing unit 122 refers to the correspondence relationship management table 131, and identifies the administrator with whom the person in charge B1 has a correspondence relationship. Here, it is assumed that the administrator A is identified.

In step S1222, the message processing unit 122 sends a signal confirming whether the simultaneous distribution message can be sent, to the terminal 20A of the administrator A via the information processing apparatus 10.

In step S1223, the accepting unit 220 of the terminal 20A of the administrator A accepts input indicating to allow the transmission of the simultaneous distribution message. Here, the accepting unit 220 may specify the distribution destination of the simultaneous distribution message.

In step S1224, the communication control unit 210 of the terminal 20A of the administrator A sends a response indicating to allow the transmission of the simultaneous distribution message, to the information processing apparatus 10.

The subsequent procedures are the same as those of steps S1202 through S1213.

(3) Operation Procedures Relevant to Viewing

With reference to FIG. 13, a description is given of operation procedures of viewing messages between the terminal 20B of the person in charge B and the terminal 20C of the customer C, from the terminal 20A of the administrator A. FIG. 13 illustrates an example of operation procedures according to the first embodiment (part 4).

In step S1301, messages are sent and received between the terminal 20C of the customer C and the terminal 20B1 of the person in charge B1, via the information processing apparatus 10. The messages that are sent and received are stored in the message management table 134.

In step S1302, when the accepting unit 220 of the terminal 20A of the administrator A accepts a request to view messages between the person in charge B and the customer C, from the administrator A, the setting request unit 232 instructs the communication control unit 210 to send a viewing request to the information processing apparatus 10. The communication control unit 210 sends the viewing request to the information processing apparatus 10. The viewing request includes the person in charge and the customer who are the targets of viewing messages. Here, it is assumed that the viewing request includes the identifier of the person in charge B1 and the identifier of the customer C.

In step S1303, when the communication control unit 110 of the information processing apparatus 10 receives the viewing request, the display control unit 123 refers to the message management table 134, and identifies the messages sent and received between the person in charge B1 and the customer C.

In step S1304, the display control unit 123 instructs, via the communication control unit 110, the terminal 20A of the administrator A to display the messages sent and received between the person in charge B1 and the customer C. The display control unit 231 of the terminal 20A of the administrator A receives the instruction, and displays the messages sent and received between the person in charge B1 and the customer C, on the screen of the terminal 20A.

Accordingly, the administrator is able to view the contents of the messages sent and received between the customer and the person in charge, and confirm the status with the customer.

The administrator may view the contents of the messages and respond to the messages on behalf of the person in charge. In this case, the procedures of steps S1305 and S1306 are executed (option 1 in FIG. 13).

In step S1305, when the accepting unit 220 of the terminal 20A of the administrator A accepts input of a message, the communication control unit 210 sends the input message to the information processing apparatus 10.

In step S1306, in response to the communication control unit 110 of the information processing apparatus 10 receiving the message, the message processing unit 122 changes the information of the transmission source of the message to the person in charge B1. Furthermore, the message processing unit 122 stores the information of the sent message in the message management table 134.

In step S1307, the message processing unit 122 instructs the communication control unit 110 to send the message to the terminal 20C of the customer C. Upon receiving the instruction, the communication control unit 110 sends the message to the terminal 20C of the customer C.

Accordingly, even when the person in charge is on vacation, on a business trip, etc., and cannot respond to messages from the customer in a timely manner, it is possible to send messages from the terminal 20A of the administrator.

Furthermore, the administrator may set a different person in charge as a substitute person in charge, and the different person in charge may respond to the messages. In this case, the procedures of steps S1308 through S1313 are executed (option 2 of FIG. 13).

In step S1308, when the accepting unit 220 of the terminal 20A of the administrator A accepts a request for a substitute setting, the setting request unit 232 instructs the communication control unit 210 to send a substitute setting request to the information processing apparatus 10. The substitute setting request includes information for identifying the substitute person in charge. Here, it is assumed that the person in charge B2 is set as the substitute person in charge of the person in charge B1.

In step S1309, when the communication control unit 110 of the information processing apparatus 10 receives the substitute setting request, the state update unit 124 sets the person in charge B2 as the substitute person in charge of the person in charge B1, in the field of the "substitute person in charge" in the state management table 133.

In step S1310, upon receiving the instruction from the state update unit 124, the communication control unit 110 of the information processing apparatus 10 reports "has been set as substitute of person in charge B1", to the terminal 20B2 of the person in charge B2.

In step S1311, when the accepting unit 220 of the terminal 20B2 of the person in charge B2 accepts input of a message to be sent on behalf of the person in charge B1, the communication control unit 210 sends the accepted message to the information processing apparatus 10. This message includes information indicating that the message is addressed to the customer C, and that the message is being sent on behalf of the person in charge B1.

In step S1312, when the communication control unit 110 of the information processing apparatus 10 receives a message from the terminal 20B2 of the person in charge B2, the state update unit 124 refers to the state management table 133, and confirms that the person in charge B2 is set as the substitute person in charge of the person in charge B1. Next, the message processing unit 122 confirms the correspondence relationship management table 131, and changes the information of the transmission source of the message to the information of the person in charge B1.

In step S1313, upon receiving an instruction from the message processing unit 122, the communication control unit 110 sends the message for which the transmission source has been changed, to the terminal 20C of the customer C.

Accordingly, even when the person in charge is on vacation, on a business trip, etc., and cannot respond to messages from the customer in a timely manner, it is possible to send messages from the terminal 20 of a different person in charge.

(5) Operation Procedures Relevant to State Report

With reference to FIG. 14, a description is given of the procedures of reporting the state by the terminal 20B1 of the person in charge B1. FIG. 14 illustrates an example of operation procedures according to the first embodiment (part 5).

In step S1401, the accepting unit 220 of the terminal 20B1 of the person in charge B1 accepts the state of the person in charge B1. Here, the state of the person in charge is, on duty, on break, on vacation, etc.

In step S1402, the setting request unit 232 instructs the communication control unit 210 to report the accepted state to the information processing apparatus 10. Upon receiving the instruction, the communication control unit 210 reports the accepted state to the information processing apparatus 10.

In step S1403, in response to the communication control unit 110 of the information processing apparatus 10 receiving the report of the state from the terminal 20B1, the state update unit 124 instructs the state management table 133 to store the received state of the person in charge B1.

In step S1404, the state update unit 124 instructs the communication control unit 110 to report the state of the person in charge B1 to the terminal 20A of the administrator A. Upon receiving the instruction, the communication control unit 110 reports the state of the person in charge B1 to the terminal 20A of the administrator A. Furthermore, the display control unit 123 of the information processing apparatus 10 may change the display mode of the icon, etc., of the person in charge B1 in the screen of the terminal 20A of the administrator A, according to the state of the person in charge B1. Accordingly, the administrator is able to appropriately recognize the status of the person in charge.

Note that the state of the person in charge may be changed after being allowed by the administrator. In this case, the terminal 20A of the administrator A receives a state change request from the terminal 20B1 of the person in charge B1, via the information processing apparatus 10. After the accepting unit 220 of the terminal 20A of the administrator A accepts permission to change the state from the administrator, the communication control unit 210 sends a report indicating that the change of state is allowed to the information processing apparatus 10, and the state is changed.

According to the state of the person in charge B1, the administrator A himself may send a message to the customer C of the person in charge B1 on behalf of the person in charge B1, or may set a substitute person in charge. The procedures of sending a message by the administrator himself on behalf of the person in charge B1 are indicated as option 1 (steps S1405 through S1407) in FIG. 14. Furthermore, the procedures of setting a substitute person in charge and sending a message are indicated as option 2 (steps S1408 through S1413) in FIG. 14. These procedures are the same as those of steps S1305 through S1313, and therefore descriptions are omitted. For example, in a state where the person in charge is unable to respond to messages from the customer C, the operations of option 1 or option 2 described above are executed.

By using the operation procedures of FIG. 14, the terminal 20A of the administrator A becomes capable of receiving a report of the state of the person in charge. Accordingly, when the person in charge is unable to respond to customers, the administrator A is able to send messages on behalf of the person in charge from the terminal 20A of the administrator A, and is able to set a substitute person in charge of the person in charge B1.

Figure 15A:
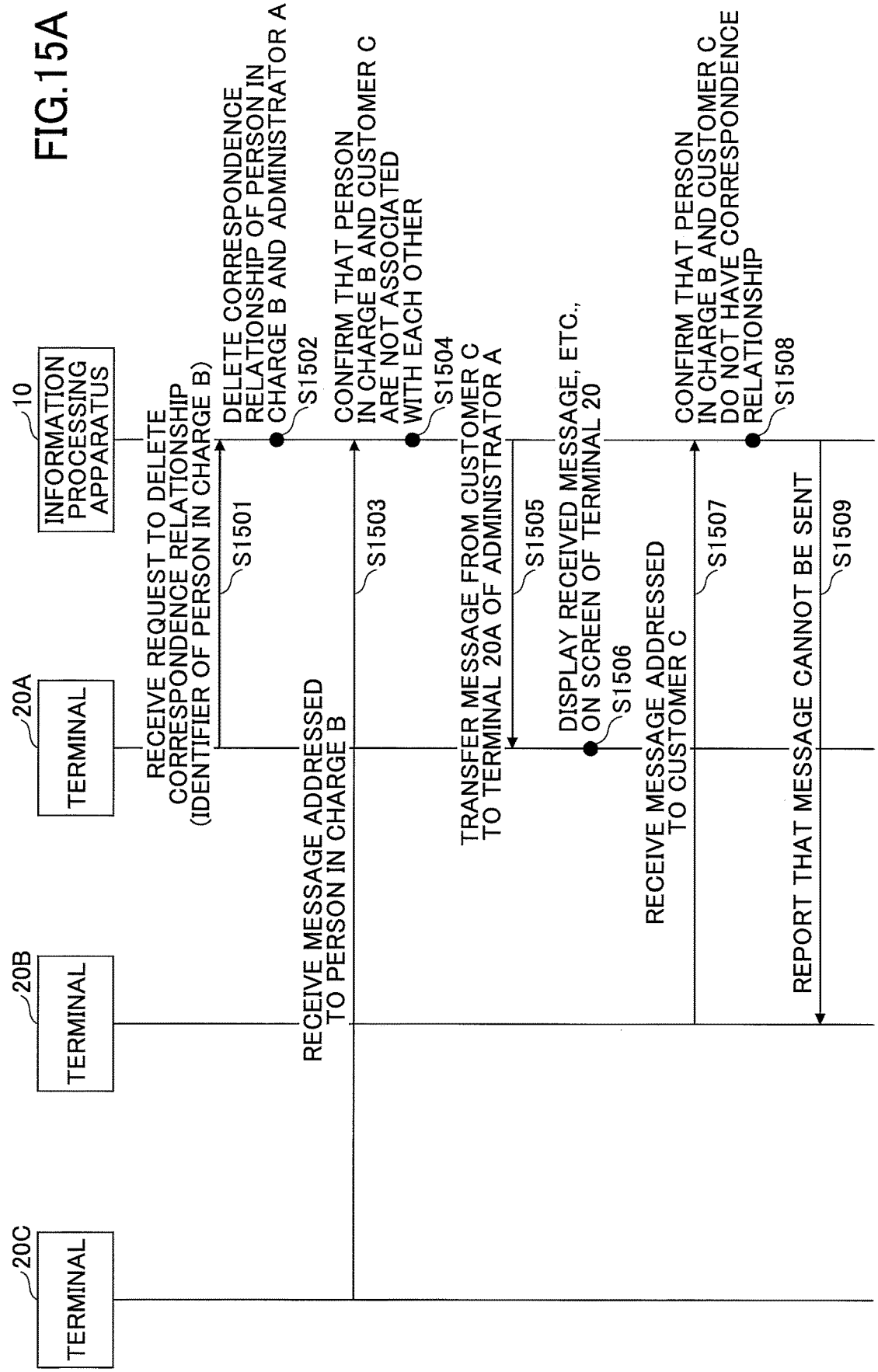
FIGS. 15A and 15B illustrate an example of operation procedures according to the first embodiment (part 6)
Figure 15B:
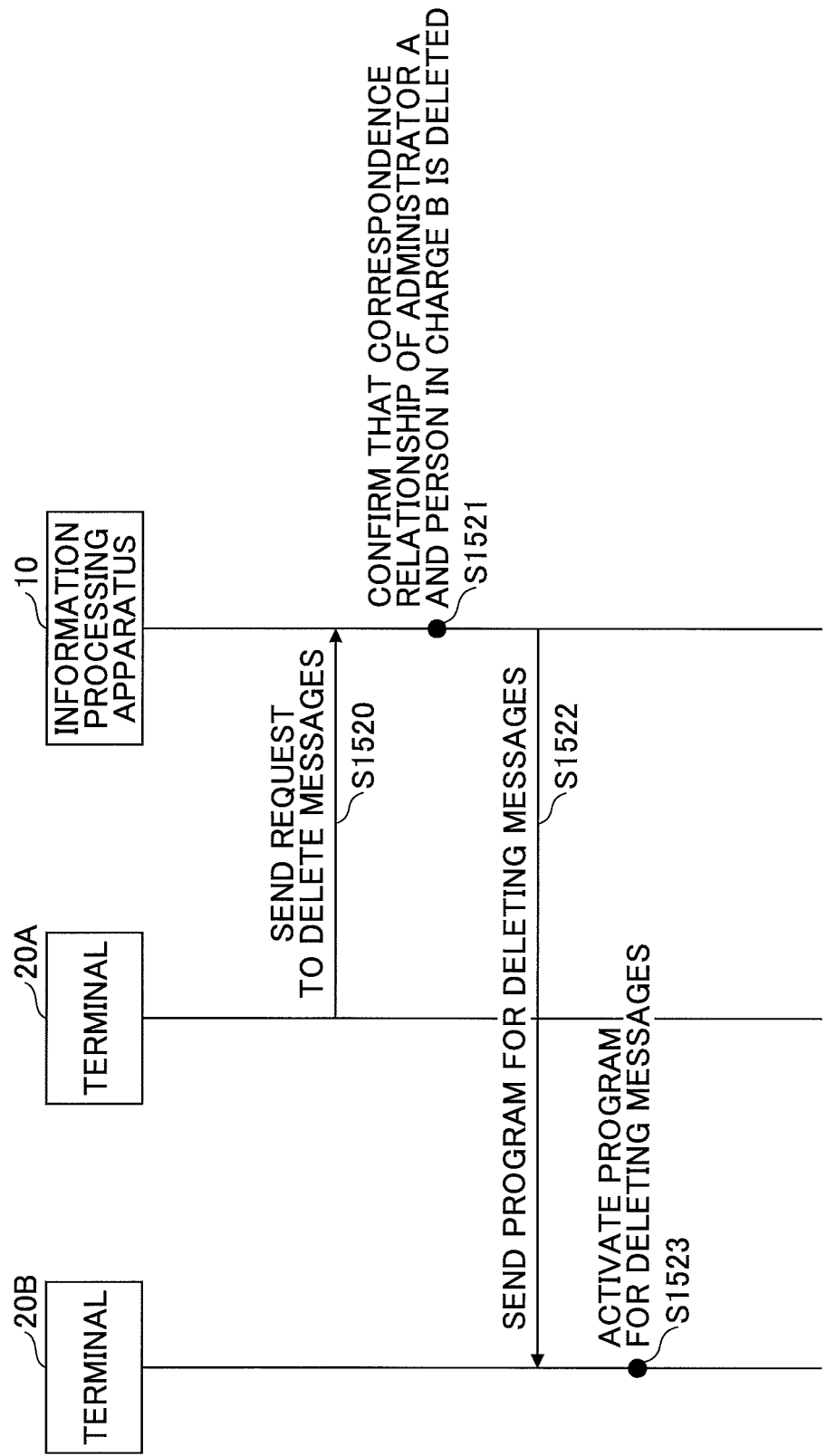

(6) Operation Procedures Relevant to Deleting Correspondence Relationship of Person in Charge and Administrator With reference to FIGS. 15A and 15B, a description is given of operation procedures relevant to deleting the correspondence relationship of the person in charge and the administrator. FIGS. 15A and 15B illustrate an example of operation procedures according to the first embodiment (part 6).

In step S1501, the communication control unit 110 of the information processing apparatus 10 receives a request to delete the correspondence relationship, from the terminal 20A of the administrator A. The request to delete the correspondence relationship includes the identifier of the person in charge for whom the correspondence relationship with the administrator A is to be deleted. Here, in the following, the description is continued assuming that the identifier of the person in charge B is included in the delete request.

In step S1502, the correspondence relationship setting unit 121 deletes the correspondence relationship of the person in charge B, the administrator A, and the customer C, from the correspondence relationship management table 131. At this time, the correspondence relationship of the administrator A and the customer C remains to be continuously stored in the correspondence relationship management table 131.

A description is given of the method of processing a message addressed to a person in charge for whom the correspondence relationship has been deleted.

In step S1503, the communication control unit 110 of the information processing apparatus 10 receives a message addressed to the person in charge B, from the terminal 20C of the customer C.

In step S1504, the message processing unit 122 confirms that in the correspondence relationship management table 131, the person in charge B and the customer C are not associated with each other, and that the customer C and the administrator A are associated with each other.

In step S1505, the message processing unit 122 instructs the communication control unit 110 to transfer the message received from the terminal 20C of the customer C, to the terminal 20A of the administrator A. Furthermore, the message processing unit 122 instructs the communication control unit 110 to also report that the message being transferred is a message addressed to the person in charge B for whom the correspondence relationship has been deleted. The communication control unit 110 sends the message and a report that the message is addressed to the person in charge B for whom the correspondence relationship has been deleted, to the terminal 20A of the administrator A.

In step S1506, in response to the communication control unit 210 of the terminal 20A of the administrator A receiving the message and the report that the message is addressed to the person in charge B for whom the correspondence relationship has been deleted, the display control unit 231 displays the received message, etc., on the screen of the terminal 20. Accordingly, the administrator A is able to perform appropriate actions such as sending a response to the message on behalf of the person in charge B.

A description is given of a method of processing a message from the terminal 20B of the person in charge for whom the correspondence relationship has been deleted.

In step S1507, the communication control unit 110 of the information processing apparatus 10 receives a message addressed to the customer C, from the terminal 20B of the person in charge B.

In step S1508, the message processing unit 122 refers to the correspondence relationship management table 131, and confirms that the person in charge B and the customer C do not have a correspondence relationship.

In step S1509, the message processing unit 122 instructs the communication control unit 110 to send a report indicating that the message cannot be sent because there is no correspondence relationship. Upon receiving the instruction, the communication control unit 110 sends a report indicating that the message cannot be sent, to the terminal 20B of the person in charge B.

Note that in the case where a talk room is activated for viewing messages exchanged with the customer C, at the terminal 20B of the person in charge B, similarly, the information processing apparatus 10 sends a report indicating that the messages cannot be viewed, because there is no correspondence relationship.

As described above, the information processing apparatus 10 does not allow messages to be sent and received by a person in charge for whom the correspondence relationship has been deleted. Therefore, when the person in charge is no longer a member of the organization to which he belonged due to resignation, etc., it is possible to appropriately protect the contact addresses of customers, the status of sending and receiving messages, etc., which are trade secrets of the organization.

Note that in the above operation procedures, a description is given of a method of sending a request to delete the correspondence relationship by the terminal 20A of the administrator A in step S1501; however, the deletion request may be sent from the terminal 20B of the person in charge B. In this case, similar to the above operation procedures, the correspondence relationship of the administrator A and the person in charge B is deleted, and the terminal 20B of the person in charge B becomes unable to send and receive messages with the terminal 20C of the customer C. Next, a description is given of a method of deleting a message from the terminal 20B of the person in charge for whom the correspondence relationship has been deleted. In the above operation procedures, it is possible to prevent new messages from being sent and received between the person in charge and the customer for whom the correspondence relationship has been deleted; however, the messages that have already been sent and received with the customer remain to be stored in the terminal 20B of the person in charge, and therefore it may not be preferable in terms of managing trade secrets, etc. Thus, upon receiving an instruction from the terminal 20A of the administrator, operation procedures of deleting messages from the terminal 20B of the person in charge, may be executed.

With reference to FIG. 15B, a description is given of operation procedures of deleting messages from the terminal of the person in charge.

In step S1520, the communication control unit 110 of the information processing apparatus 10 receives a request to delete messages from the terminal 20B of the person in charge B, from the terminal 20A of the administrator A.

In step S1521, the correspondence relationship setting unit 121 refers to the correspondence relationship management table 131, and confirms that the correspondence relationship of the administrator A and the person in charge B has been deleted. The correspondence relationship setting unit 121 instructs the communication control unit 110 to send a program for deleting messages to the terminal 20B of the person in charge B. The program for deleting messages has a function of deleting messages from the terminal 20. Here, it is assumed that the program for deleting messages has a setting for deleting messages that have been sent and received between the customer C and the person in charge B, who have a correspondence relationship with the administrator A.

In step S1522, the communication control unit 110 sends the program for deleting messages to the terminal 20B of the person in charge B.

In step S1523, when the communication control unit 210 of the terminal 20B of the person in charge B receives the program for deleting messages, the program for deleting messages is activated in the terminal 20B, and the messages sent and received between the customer C and the person in charge B are deleted.

Here, the timing of sending the program for deleting messages may be set by the information processing apparatus 10 upon receiving an instruction from the terminal 20A of the administrator A. For example, a setting may be made such that the program is activated at a timing when a correspondence relationship of the person in charge B and a new administrator is set.

After deleting the messages, the communication control unit 210 of the information processing apparatus 10 receives a report indicating that the deletion of messages has been completed, from the terminal 20B of the person in charge B.

Accordingly, it is possible to prevent the administrator with which a correspondence relationship has been newly set, from viewing the messages sent and received between the person in charge B and the customer during the period when there was a correspondence relationship with the administrator A.

Note that the procedure of step S1520 may be executed together with the procedure of step S1501.

In the operation procedures described above, the program for deleting messages is sent to the terminal 20B of the person in charge and the messages are deleted from the terminal 20B; however, a setting may be made such that the message cannot be viewed by the administrator with whom a correspondence relationship is newly set.

In this case, the correspondence relationship setting unit 121 of the information processing apparatus 10 stores the time and date when the correspondence relationship with the new administrator has been set, in the correspondence relationship management table 131. Then, when a request to view messages is received from the terminal 20 of the new administrator, the display control unit 123 displays only the messages from and after the time and date when the correspondence relationship has been set, on the terminal 20 of the new administrator.

(7) Operation Procedures Relevant to Activating Service Provided by Organization to which User Belongs With reference to FIG. 16, a description is given of operation procedures relevant to activating a service provided by an organization to which a user belongs.

FIG. 16 illustrates an example of operation procedures according to the first embodiment (part 7).

In step S1601, a talk room #1 is activated at the terminal 20C of the customer C and the terminal 20B of the person in charge B, and messages are sent and received.

In step S1602, the accepting unit 220 of the terminal 20B of the person in charge B accepts an instruction to display the service information provided by the organization to which the person in charge belongs. The instruction to display the information includes information identifying the terminal 20 on which the service information is to be displayed. Here, in the following, the description is continued assuming that an instruction to display the service information on the terminal 20C of the customer C is accepted.

In step S1603, the setting request unit 232 of the terminal 20B of the person in charge B instructs the communication control unit 210 to send the accepted request to display the service information to the information processing apparatus 10. Upon receiving the instruction, the communication control unit 210 sends the request to display the service information, to the information processing apparatus 10. The request to display the service information includes information for identifying the customer C that is the display destination.

In step S1604, when the communication control unit 110 of the information processing apparatus 10 accepts the request to display the service information, the display control unit 123 confirms the service information storage table 135, and identifies the service information of the organization to which the person in charge B belongs.

For example, when the person in charge is a hair stylist and the organization to which the person in charge belongs is a hair salon, a reservation menu, the service fees, etc., of the hair salon are stored in the service information storage table 135 as the service information. For example, when the person in charge is a real estate salesperson, and the organization to which the person in charge belongs is a real estate agency, information of the properties being handled, a visiting reservation menu, etc., are stored in the service information storage table 135 as service information.

In step S1605, the display control unit 123 reports the identified service information to the terminal 20C of the customer C via the communication control unit 110, and also displays the service information on the terminal 20C.

In step S1606, the accepting unit 220 of the terminal 20C of the customer C accepts a selection with respect to the displayed service information.

In step S1607, the communication control unit 210 of the terminal 20C of the customer C reports the selected service information to the information processing apparatus 10.

In step S1608, in response to the report of the selected service information, the control unit 120 of the information processing apparatus 10 provides the corresponding service. For example, when "service fee" is selected, the display control unit 123 of the information processing apparatus 10 displays information such as detailed service fees, coupons, etc. For example, when "reservation" is selected, the display control unit 123 of the information processing apparatus 10 displays the time periods in which reservations can be made in a selectable state, on the terminal 20C of the customer C.

When the corresponding service is provided by another information processing apparatus, the information relevant to the selected service may be reported to another information processing apparatus, or the connection destination of another information processing apparatus may be reported to the terminal 20C of the customer C.

Accordingly, it is possible to realize a smooth shift to providing the service in the information processing apparatus 10, from chats in the talk room.

Note that the service provided by the organization to which a user belongs, may be expressed as a service provided by the administrator. This is because, when the administrator is the business manager or the responsible person of the organization to which a user belongs, the service provided by the organization is substantially the same as the service provided by the administrator.

Figure 17B:
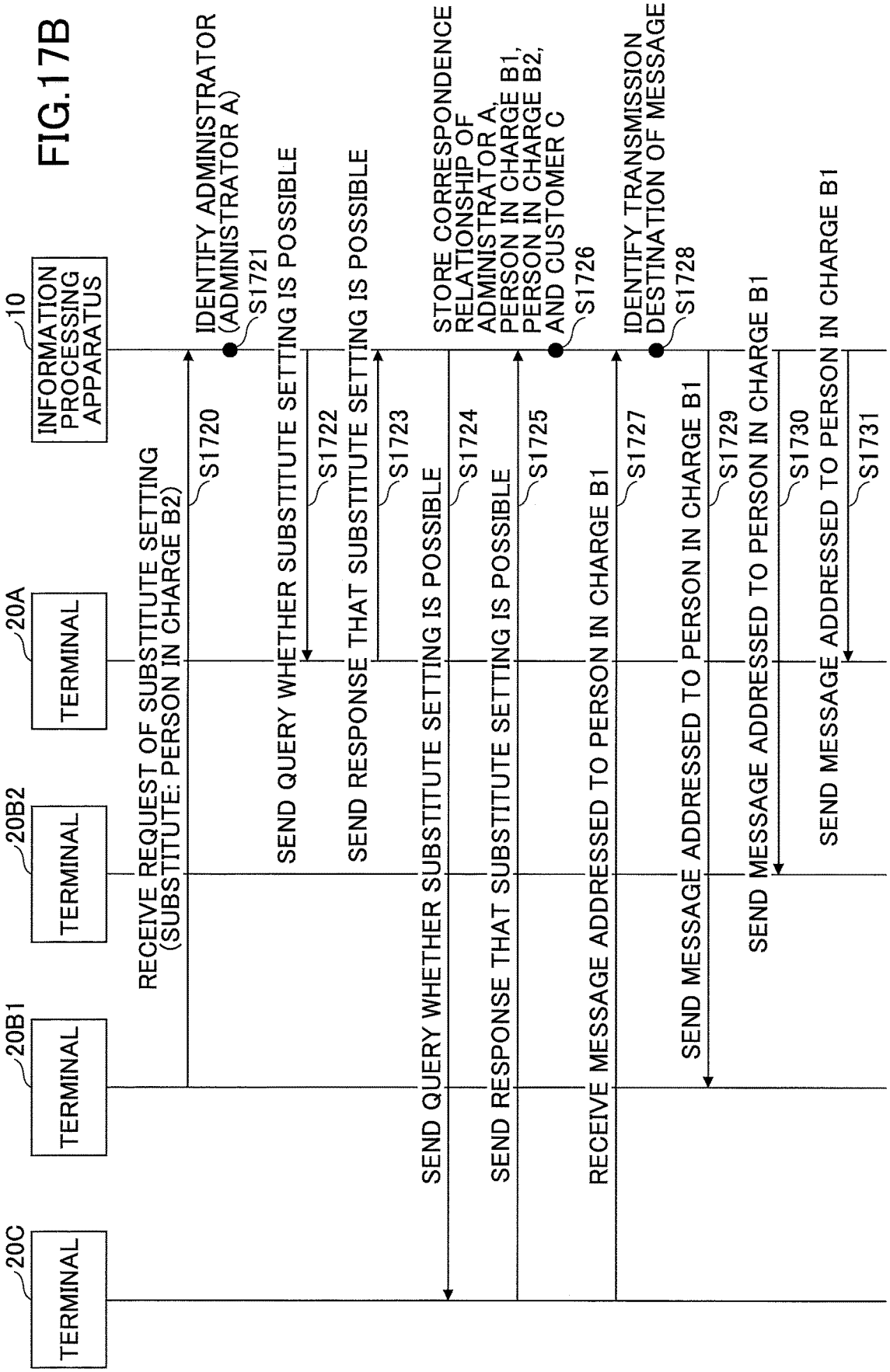

(8) Operation Procedures Relevant to Simultaneously Sending and Receiving Message In the "operation procedures relevant to viewing" described with reference to FIG. 13, the messages sent and received between the person in charge and the customer are viewed by the administrator and the person in charge set as the substitute person in charge, with the use of the message management table 134 of the information processing apparatus 10. The operation procedures of FIGS. 17A through 17C are characterized in that the terminal 20B of the person in charge and the terminal 20A of the administrator simultaneously send and receive messages. FIGS. 17A through 17C illustrate an example of operation procedures according to the first embodiment (part 8).

FIG. 17A illustrates operation procedures in which the messages sent and received between the terminal 20C of the customer C and the terminal 20B of the person in charge B are simultaneously sent to the terminal 20A of the administrator A as well.

First, a description is given of operation procedures of sending a message addressed to the terminal 20B of the person in charge B by the terminal 20C of the customer C.

In step S1701, the communication control unit 110 of the information processing apparatus 10 receives a message addressed to the person in charge B, from the terminal 20C of the customer C.

In step S1702, the message processing unit 122 refers to the correspondence relationship management table 131, and identifies the administrator of the person in charge B. Here, it is assumed that the administrator A has been identified. The message processing unit 122 instructs the communication control unit 110 to send the message addressed to the person in charge B received from the customer C, to the terminal 20B of the person in charge B and the terminal 20A of the administrator A.

In step S1703, the communication control unit 110 sends the message addressed to the person in charge B from the customer C, to the terminal 20B of the person in charge B.

In step S1704, the communication control unit 110 sends the message addressed to the person in charge B from the customer C, to the terminal 20A of the administrator A.

Next, a description is given of operation procedures in which the terminal 20B of the person in charge B sends a message to the terminal 20C of the customer C.

In step S1705, the communication control unit 110 of the information processing apparatus 10 receives a message addressed to the customer C from the terminal 20B of the person in charge B.

In step S1706, the message processing unit 122 refers to the correspondence relationship management table 131, and identifies the administrator of the person in charge B. Here, it is assumed that the administrator A is identified. The message processing unit 122 instructs the communication control unit 110 to send the message addressed to the customer C received from the person in charge B, to the terminal 20C of the customer C and the terminal 20A of the administrator A.

In step S1707, the communication control unit 110 sends the message addressed to the customer C from the person in charge B, to the terminal 20C of the customer C.

In step S1708, the communication control unit 110 sends the message addressed to the customer C from the person in charge B, to the terminal 20A of the administrator A.

Accordingly, the administrator is able to confirm the sending and receiving status of messages between the customer and the person in charge, in a timely manner.

FIG. 17B illustrates operation procedures in which the messages are also simultaneously sent to another person in charge, in addition to the administrator.

In step S1720, the communication control unit 110 of the information processing apparatus 10 receives a request for substitute setting, from the terminal 20B1 of the person in charge B1. The request for substitute setting includes the identifier of the person in charge to be set as the substitute person in charge (person in charge B2).

In step S1721, the correspondence relationship setting unit 121 refers to the correspondence relationship management table 131, and identifies the administrator of the person in charge B1. Here, it is assumed that the administrator A is identified.

In step S1722, upon receiving the instruction from the correspondence relationship setting unit 121, the communication control unit 110 sends a signal of a query as to whether the substitute setting is possible, to the terminal 20A of the administrator A.

In step S1723, when the accepting unit 220 of the terminal 20A of the administrator A accepts input that substitute setting is possible, the communication control unit 210 sends a response indicating that substitute setting is possible, to the information processing apparatus 10.

In step S1724, upon receiving the instruction from the correspondence relationship setting unit 121, the communication control unit 110 sends a signal of a query as to whether the substitute setting is possible, to the terminal 20C of the customer C.

In step S1725, when the accepting unit 220 of the terminal 20C of the customer C accepts input that substitute setting is possible, the communication control unit 210 sends a response indicating that substitute setting is possible, to the information processing apparatus 10.

In step S1726, the correspondence relationship setting unit 121 stores a correspondence relationship of the administrator A, the person in charge B1, the person in charge B2, and the customer C, in the correspondence relationship management table 131. Furthermore, the state update unit 124 may store the setting of the substitute person in charge, in the state management table 133.

In step S1727, the communication control unit 110 of the information processing apparatus 10 receives a message addressed to the person in charge B1, from the terminal 20C of the customer C.

In step S1728, the message processing unit 122 refers to the correspondence relationship management table 131, and identifies the transmission destination of the message.

In step S1729, upon receiving the instruction from the message processing unit 122, the communication control unit 110 sends the message addressed to the person in charge B1 from the customer C, to the terminal 20B1 of the person in charge B1.

In step S1730, upon receiving the instruction from the message processing unit 122, the communication control unit 110 sends the message addressed to the person in charge B1 from the customer C, to the terminal 20B2 of the person in charge B2.

In step S1731, upon receiving the instruction from the message processing unit 122, the communication control unit 110 sends the message addressed to the person in charge B1 from the customer C, to the terminal 20A of the administrator A.

FIG. 17C illustrates operation procedures in which a message from the person in charge is sent to the customer after being confirmed by the administrator. In step S1740, the communication control unit 110 of the information processing apparatus 10 receives a message addressed to the customer C from the terminal 20B of the person in charge B.

In step S1741, the message processing unit 122 refers to the correspondence relationship management table 131, and identifies the administrator of the person in charge B. Here, it is assumed that the administrator A is identified. The message processing unit 122 determines that permission for transmission from the administrator A is necessary, before sending the message to the terminal 20C of the customer C, and instructs the communication control unit 110 to send a signal of a query as to whether the message can be sent, to the terminal 20A of the administrator A.

In step S1742, upon receiving the instruction, the communication control unit 110 sends a signal of a query as to whether the message can be sent, to the terminal 20A of the administrator A. This signal includes the contents of the message.

In step S1743, when input for allowing the transmission of the message is accepted by the accepting unit 220 of the terminal 20A of the administrator A, the communication control unit 210 sends a response of allowing the transmission of the message, to the information processing apparatus 10.

In step S1744, upon receiving the instruction from the message processing unit 122, the communication control unit 110 of the information processing apparatus 10 sends the message to the terminal 20C of the customer C.

By executing the procedures of FIG. 17C, the administrator is able to confirm the message from the person in charge to the customer, before distribution of the message.

The procedures of FIG. 17C are executed when sending and receiving messages; however, these procedures may be executed when sending a content such as a stamp, a still image, a video, etc., from the terminal 20B of the person in charge B to the terminal 20C of the customer C. Accordingly, it is possible to confirm at the terminal 20A of the administrator A as to whether the organization, to which the administrator and the person in charge belong, has the authority to distribute the content, before distributing the content, and to allow distribution only when the organization has the authority.

(9) Transmission of Content

As described above, the content, which the administrator and the person in charge are allowed to use, may be shared with the customer, when the administrator, the person in charge, and the customer have a correspondence relationship. For example, when the administrator has a content such as the stamp, etc., of the organization to which the administrator belongs, the content may be shared with a customer and the organization can be advertised to the customer.

Figure 18:
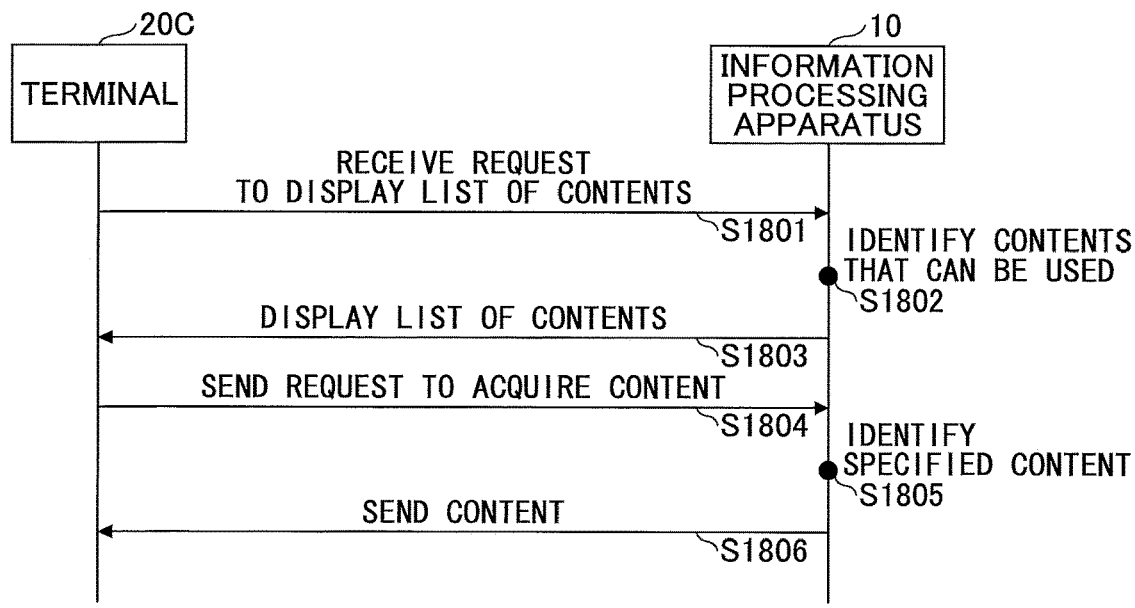
FIG. 18 illustrates an example of operation procedures according to the first embodiment (part 9)

With reference to FIG. 18, a description is given of operation procedures of sending a content. FIG. 18 illustrates an example of operation procedures according to the first embodiment (part 9).

In step S1801, the communication control unit 110 of the information processing apparatus 10 receives a request to display a list of contents, from the terminal 20C of the customer C.

In step S1802, the display control unit 123 of the information processing apparatus 10 refers to the content management table 136, and identifies contents that can be used by the customer C and the person in charge B and the administrator A who have a correspondence relationship with the customer C. The display control unit 123 instructs the terminal 20C to display the list of identified contents, via the communication control unit 110.

In step S1803, in response to the communication control unit 210 of the terminal 20C of the customer C receiving the instruction, the display control unit 231 displays the list of contents on the screen of the terminal 20C.

In step S1804, in response to the accepting unit 220 of the terminal 20C of the customer C accepting a selection of a content from the displayed list of contents, the communication control unit 210 sends a request to acquire the content, to the information processing apparatus 10.

In step S1805, the display control unit 123 identifies the content specified in the request to acquire the content, and instructs the communication control unit 110 to send the content.

In step S1806, the communication control unit 110 sends the content to the terminal 20C of the customer C.

(10) Selection of Person in Charge

In the embodiment described above, a description is given of operation procedures of setting a correspondence relationship with the administrator, when the customer and the person in charge are associated with each other. Also in a case where the administrator and the customer are associated with each other, a correspondence relationship with the person in charge can be set by performing the same procedures as above. These procedures are assumed to be executed when, for example, the customer becomes a member of the organization to which the administrator belongs, and a new person in charge is set.

Figure 19:
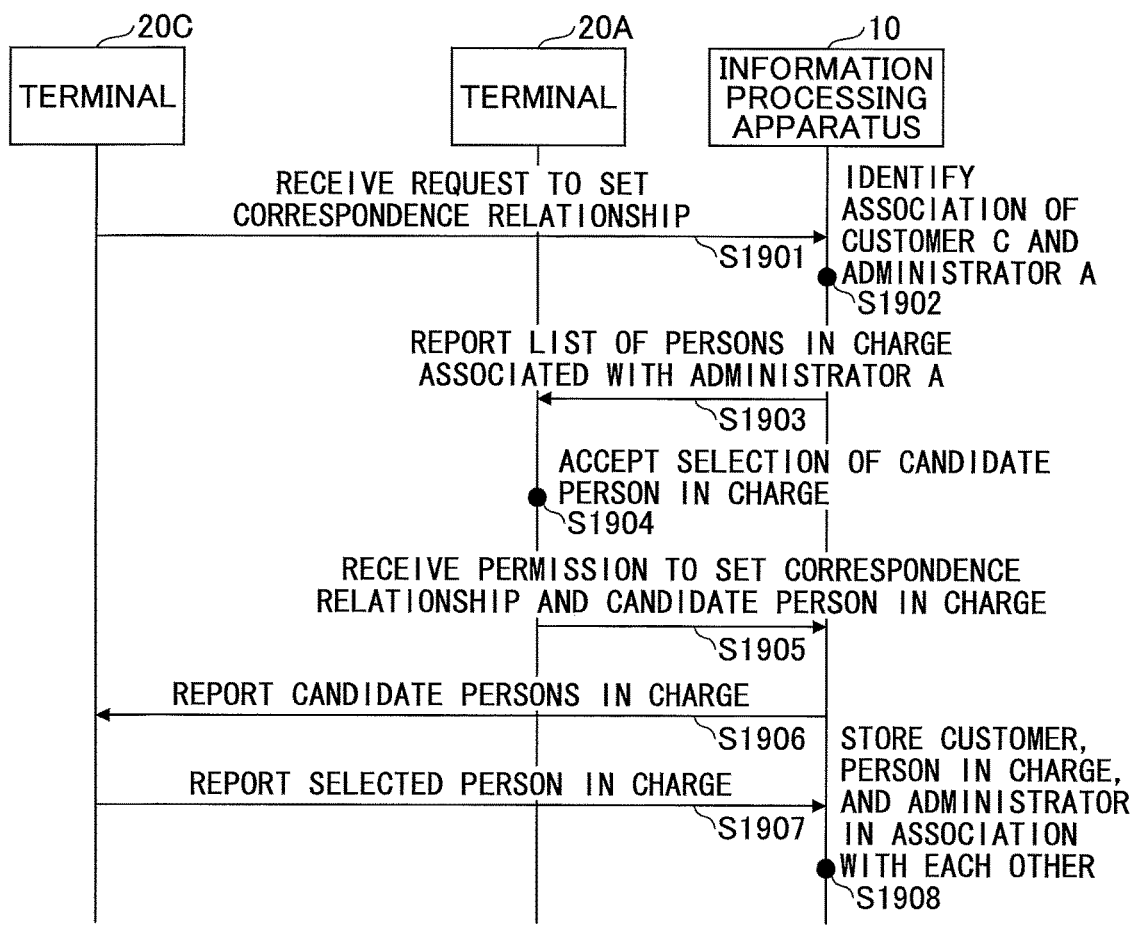
FIG. 19 illustrates an example of operation procedures according to the first embodiment (part 10)

With reference to FIG. 19, a description is given of operation procedures of selecting a person in charge. FIG. 19 illustrates an example of operation procedures according to the first embodiment (part 10).

In step S1901, the communication control unit 110 of the information processing apparatus 10 receives a request to set a correspondence relationship from the terminal 20C of the customer C.

In step S1902, the correspondence relationship setting unit 121 refers to the correspondence relationship management table 131, and identifies that the customer C is associated with the administrator A.

In step S1903, the correspondence relationship setting unit 121 extracts the person in charge who is associated with the administrator A. The correspondence relationship setting unit 121 reports that a request to set a correspondence relationship has been received from the customer C to the terminal 20A of the administrator A, via the communication control unit 110. Furthermore, the list of extracted persons in charge is also reported to the terminal 20A of the administrator A.

In step S1904, upon receiving the report from the information processing apparatus 10, the display control unit 231 of the terminal 20A of the administrator A displays the list of extracted persons in charge on a screen, and also displays a report that the request to set a correspondence relationship has been received from the customer C, on the screen. The accepting unit 220 accepts input of permission to set a correspondence relationship and a selection of one or more candidate persons in charge from the list of extracted persons in charge.

In step S1905, the communication control unit 110 of the information processing apparatus 10 receives a message of permission to set a correspondence relationship, and the candidate persons in charge, from the terminal 20A of the administrator A.

In step S1906, the correspondence relationship setting unit 121 of the information processing apparatus 10 reports the candidate persons in charge to the terminal 20C of the customer C, via the communication control unit 110.

In step S1907, when the accepting unit 220 of the terminal 20C of the customer C accepts a selection of a person in charge from the candidate persons in charge, the communication control unit 110 reports the selected person in charge to the information processing apparatus 10, based on an instruction from the setting request unit 232.

In step S1908, in response to the communication control unit 110 of the information processing apparatus 10 receiving the correspondence relationship, the correspondence relationship setting unit 121 stores the customer, the person in charge, and the administrator in association with each other, in the correspondence relationship management table 131.

In the above-described operation procedures, the administrator A selects the candidate persons in charge; however, this procedure may be omitted, and the list of persons in charge extracted by the information processing apparatus 10 may be reported to the terminal 20C of the customer C. Furthermore, the list of persons in charge may be sorted according to attributes of the customer C (age, gender, etc.), and the sorted list may be displayed on the terminal 20C of the customer C.

<Screen Display>

With reference to FIGS. 20A through 24, a description is given of screen displays of the terminal 20 according to the first embodiment.

(1) Screen Display of Talk Room and Service Menu

Figure 20A:
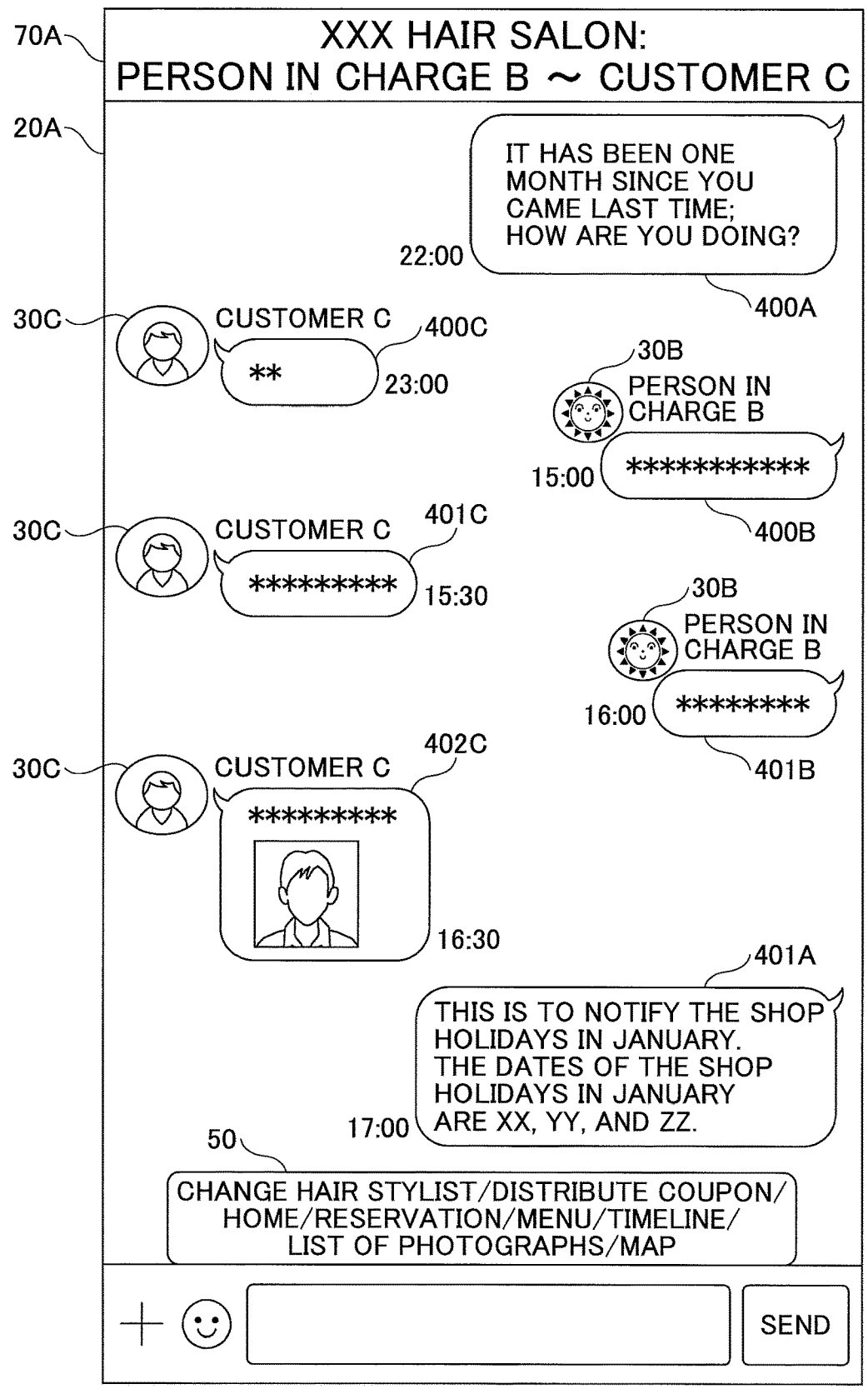
FIGS. 20A through 20C illustrate examples of screen displays of the terminal according to the first embodiment (part 1)
Figure 20B:
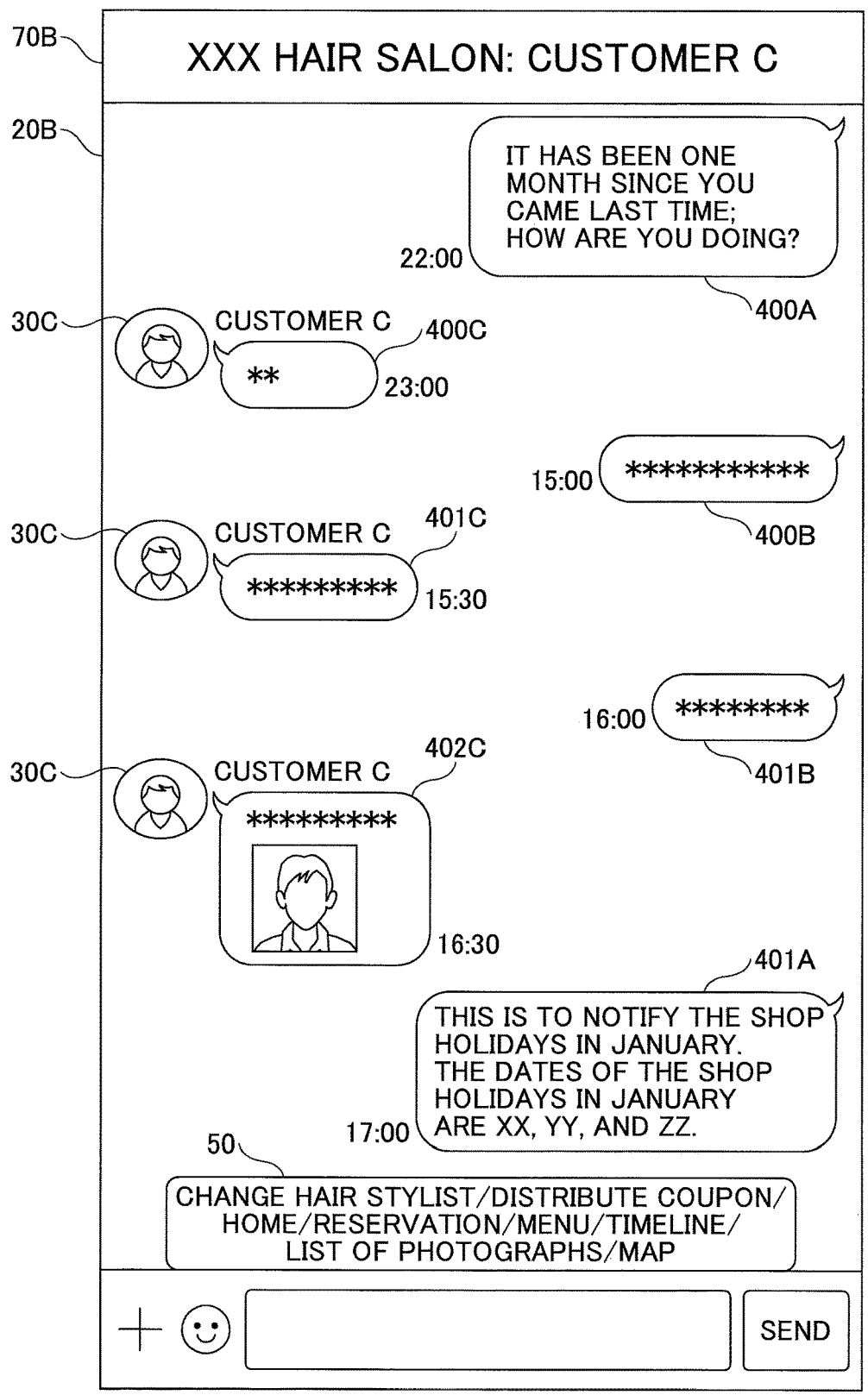
Figure 20C:
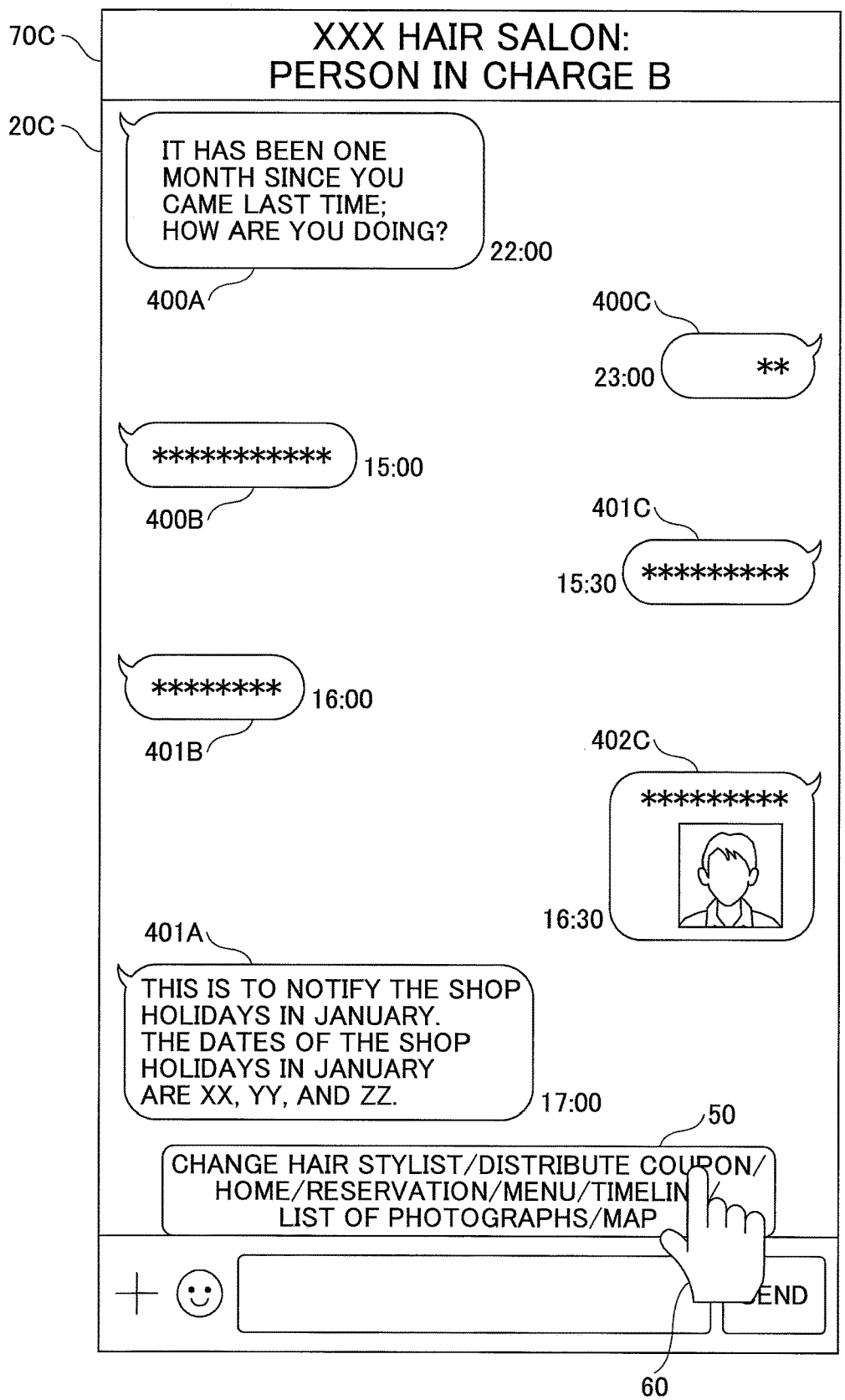

With reference to FIGS. 20A through 20C, a description is given of screen displays when messages are sent and received between the terminal 20B of the person in charge B and the terminal 20C of the customer C, in a talk room in which the administrator A, the person in charge B, and a customer C have a correspondence relationship. FIGS. 20A through 20C illustrate examples of screen displays of the terminal 20 according to the first embodiment (part 1).

FIGS. 20A through 20C illustrate screen displays of the terminal 20, when messages, which are sent and received between the terminal 20B of the person in charge B and the terminal 20C of the customer C, are viewed by the terminal 20A of the administrator A, in the operation procedures of FIG. 13.

FIG. 20A illustrates an example of a screen display of the terminal 20A of the administrator A. Messages sent and received in the talk room are displayed. Messages (400B, 401B) sent from the person in charge B are displayed together with the icon 30B and the user name (person in charge B) of the person in charge B. Furthermore, the messages and still image contents (400C, 401C, 402C) sent from the customer C are displayed together with an icon 30C and a user name (customer C) of the customer C. Messages (400A, 401A) sent from the administrator A are sent from himself, and are thus not displayed together with an icon or a user name (administrator A).

The messages of the person in charge B and the messages of the customer C are displayed together with icons 30 and user names, and the messages of the administrator A are not displayed together with an icon or a user name, and therefore the administrator can easily confirm the transmitter of a message.

On the screen of the terminal 20, a service menu 50, which is information of a service provided by the organization to which the administrator and the person in charge belong, is displayed. As the title of the talk room, "XXX HAIR SALON: PERSON IN CHARGE B CUSTOMER C (70A)" is set.

FIG. 20B illustrates an example of a screen display of the terminal 20B of the person in charge B. The parts that are different from FIG. 20A are mainly described. The messages and still image contents (400C, 401C, 402C) sent from the customer C are displayed together with the icon 30C and the user name (customer C) of the customer C. In FIG. 20B, the messages (400A, 401A) sent from the administrator A are not displayed together with an icon or a user name; however, these messages may be displayed together with an icon, etc.

FIG. 20C illustrates an example of a screen display of the terminal 20C of the customer C. The parts that are different from FIGS. 20A and 20B are mainly described. The messages (400B, 401B) sent from the person in charge B and the messages (400A, 401A) sent from the administrator A are displayed on the left side of the screen. The messages and still image contents (400C, 401C, 402C) sent from the customer C are displayed on the right side of the screen. In the example of the display screen of FIG. 20C, the messages from the person in charge B and the messages from the administrator A are not distinguished from each other in the display screen. These messages are recognized as messages from the person in charge B, by the customer C.

In the examples of FIGS. 20A through 20C, as the messages from the administrator A, general information (message 401A) relevant to the XXX hair salon that is the organization to which the administrator A belongs, and a fixed phrase prompting the customer to come to the salon (message 400A) are sent. As messages from the person in charge B, specific responses (messages 400B, 401B) to queries from the customer are sent. As described above, the tasks of creating the messages sent from the terminal 20A of the administrator A and the messages sent from the terminal 20B of the person in charge B are divided between the administrator A and the person in charge B, and therefore it is possible to reduce the load of both parties while providing detailed advice, etc., to the customer.

As illustrated in FIG. 20C, at the bottom part of the display screen of the terminal 20C of the customer, the service menu 50 is displayed. When the accepting unit 220 of the terminal 20C accepts a selection from the service menu 50, the terminal 20C of the customer C is connected to the information processing apparatus 10 providing the service menu, and the customer C is able to receive the selected service provided from the information processing apparatus 10. In the following, the description is continued assuming that "reservation" has been selected from the service menu 50 in FIG. 20C.

FIG. 21 illustrates an example of a screen display of the terminal 20 according to the first embodiment (part 2). FIG. 21 illustrates a display screen of the terminal 20C, when providing a service of the service menu 50 selected by the terminal 20C of the customer C. FIG. 21 is displayed on the screen of the terminal 20C, when executing the operation procedures relevant to activating a service provided by an organization to which a user belongs illustrated in FIG. 16.

FIG. 21 illustrates a reservation menu being displayed on the screen of the terminal 20C. When the accepting unit 220 of the terminal 20C accepts a selection of a desired time and date, a reservation request is sent from the communication control unit 210 to the information processing apparatus 10, and a process relevant to a reservation is executed.

(2) Screen Display when Selecting a View Destination

FIGS. 22A and 22B illustrate examples of screen displays of the terminal 20 according to the first embodiment (part 3). With reference to FIGS. 22A and 22B, a description is given of screen displays of the terminal 20A of the administrator A when selecting a view destination.

In step S1302 of FIG. 13, the procedure of accepting a selection of the talk room to be viewed from the administrator A, by the accepting unit 220 of the terminal 20A of the administrator A is described; a list of talk rooms that can be selected at this step may be displayed on the screen of the terminal 20A.

FIG. 22A illustrates a list of talk rooms, which can be viewed by the administrator A of the terminal 20A, being displayed in an order according to persons in charge with whom the administrator A is associated. Each talk room is displayed together with the name of the person in charge, the icon 30B of the person in charge, the name of the customer, the icon 30C of the customer, and the newest message. The newest message is displayed together with the time and date when the message is sent and received.

FIG. 22B illustrates a list of talk rooms, which can be viewed by the administrator A of the terminal 20A, being displayed in chronological order according to the time when the messages associated with the administrator have been sent and received. The information displayed in the list of talk rooms are the same as that of FIG. 22A.

(3) Screen Display of Selecting Person in Charge

FIG. 23 illustrates an example of a screen display of the terminal 20 according to the first embodiment (part 4). With reference to FIG. 23, a description is given of a screen display of the terminal 20A of the administrator A when associating a person in charge to the customer C.

In step S1904 of FIG. 19, an operation of the display control unit 231 of the terminal 20A of the administrator A displaying a list of extracted persons in charge on the screen of the terminal 20A, is described. FIG. 23 illustrates an example of a screen display of the terminal 20A at this step. As information of the target customer, the user name and the icon 30C of the customer C, who is the user of the terminal 20C that has sent the association request, are displayed. Furthermore, the user names and icons 30B of the person in charge A, the person in charge B, and the person in charge C are displayed as candidate persons in charge.

(4) Screen Display of Terminal of Administrator

FIG. 24 illustrates an example of a screen display of the terminal 20 according to the first embodiment (part 5). FIG. 24 illustrates an example of a management menu of persons in charge, displayed on the screen of the terminal 20A of the administrator.

When the administrator A is viewing the messages exchanged between the person in charge B and the customer C, the messages sent and received between the person in charge B and the customer C are displayed in the message display field 70.

When the accepting unit 220 accepts a selection from a talk room menu 75, the display control unit 231 displays the selected talk room on the screen of the terminal 20A. For example, when a selection of a talk room menu 75A is accepted, a talk room with the customer "YY YY" and "XXX hair salon" is displayed on the terminal 20A.

Furthermore, when the state of the person in charge B is changed, the changed state is displayed. For example, on vacation 77 indicates that the state of the person in charge B2 is on vacation.

[Other]

The administrator is an example of a first user. The person in charge is an example of a second user. The customer is an example of a third user. The information storage unit 130 is an example of a storage unit. The communication control unit 110 is an example of a sending unit and a receiving unit.

A storage medium storing program codes of software for realizing the functions of the above-described embodiments may be supplied to the information processing apparatus 10. Then, the above embodiments may be achieved by having the information processing apparatus 10 read the program codes stored in the storage medium and executing the program codes. In this case, the storage medium stores a program for causing the information processing apparatus 10 execute the above display control method.

Specifically, the storage medium stores a program to be executed by the information processing apparatus, the program causing the information processing apparatus to execute a step of storing a correspondence relationship of a first user, a second user associated with the first user, and a third user associated with the second user; a step of receiving a message from the first user to the third user, from a terminal of the first user; and a step of sending the message received from the terminal of the first user as a message from the second user, to a terminal of the third user.

Then, the program codes read from the storage medium realize the functions according to the above-described embodiments.

Furthermore, a computer device executes the program codes that have been read, and therefore not only the functions according to the above-described embodiments realized. According to instructions of the program codes, an operating system (OS), etc., operating in the computer device may execute part of or all of the actual processes. Furthermore, the functions according to the above-described embodiments may be realized by these processes.

According to one embodiment, messages can be sent to a terminal in a timely manner.

The present invention is not limited to the specific embodiments described herein, and variations and modifications may be made without departing from the spirit and scope of the present invention.

The present application is based on and claims the benefit of priority of Japanese Priority Patent Application No. 2015-250307, filed on Dec. 22, 2015, the entire contents of which are hereby incorporated herein by reference.

What is claimed is:

1. A method comprising:
receiving, using at least one processor of an information processing apparatus, a message over a messaging service from a first terminal of a message source to a second terminal of a message recipient, the message source being a first user of the messaging service, and the message recipient being a second user of the messaging service;
determining, using the at least one processor, at least one servicing user associated with the message recipient, the at least one servicing user including at least a third user of the messaging service, based on correspondence relationships associated with the first user and the second user set in a database including the first user, the second user, and the third user;
determining, using the at least one processor, a current availability of the at least one servicing user on the messaging service using the database;
changing, using the at least one processor, the message source of the received message based on results of the determining the current availability of the at least one servicing user; and
sending, using the at least one processor, the message received from the first terminal of the first user as a message from the message source which is changed from the first user to the third user based on the current availability of the at least one servicing user, to the second terminal of the second user over the messaging service.

2. The method according to claim 1, further comprising:
receiving, using the at least one processor, a request to associate the first user with the third user, from the first terminal; and
storing, using the at least one processor, an association of the first user and the third user in the database.

3. The method according to claim 2, further comprising:
receiving, using the at least one processor, a request to associate the second user with the third user, from the second terminal; and
storing, using the at least one processor, an association of the second user and the third user in the database, wherein
after the association of the second user and the third user is stored, the correspondence relationship is stored.

4. The method according to claim 1, further comprising:
querying, using the at least one processor, a third terminal of the third user as to whether the message received from the first terminal can be sent as the message from the third user; and
receiving, using the at least one processor, a response of approval to the query, from the third terminal, wherein the sending is executed after the response is received.

5. The method according to claim 1, wherein
when the first user is associated with a first plurality of third users, and the second user is associated with a second plurality of third users,
sending, using the at least one processor, the message received from the first terminal, as the message from one of the first plurality of third users, to the second terminal, the one of the first plurality of third users also being one of the second plurality of third users.

6. The method according to claim 1, further comprising:
receiving, using the at least one processor, the message from the first user at the second terminal; and
displaying, using the at least one processor, the message from the first user on a display device at the second terminal, wherein
the message from the first user is displayed in a same display mode as the message from the third user.

7. The method according to claim 1, further comprising:
receiving, using the at least one processor, a request to view a message, from the first terminal; and
displaying, using the at least one processor, a message sent between the second user and the third user, on a display device at the first terminal.

8. The method according to claim 1, further comprising:
displaying, using the at least one processor, information of a service provided by the first user, on a display device at the second terminal, while a third terminal of the third user and the second terminal are communicating; and
providing, using the at least one processor, the service that has been selected, to the second terminal, in response to the displayed information of the service being selected.

9. The method according to claim 1, further comprising:
receiving, using the at least one processor, a request to delete an association of the first user and the third user stored in the database from the first terminal or a third terminal of the third user; and
deleting, using the at least one processor, a message sent between the second user and the third user, from the third terminal.

10. The method according to claim 1, further comprising:
receiving, using the at least one processor, a current availability of the third user from a third terminal of the third user;
updating, using the at least one processor, the current availability of the third user in the database; and
reporting, using the at least one processor, the received current availability of the third user to the first terminal.

11. The method according to claim 10, further comprising:
sending, using the at least one processor, a message from the second user addressed to the third user to the first terminal, when the current availability of the third user indicates that the third user is in the state of being unable to respond to a message.

12. An information processing apparatus comprising:
a memory having computer readable instructions stored thereon; and
at least one processor configured to execute the computer readable instructions to,
   receive a message over a messaging service from a first terminal of a message source to a second terminal of a message recipient, the message source being a first user of the messaging service, and the message recipient being a second user of the messaging service;
   determine at least one servicing user associated with the message recipient, the at least one servicing user including at least a third user of the messaging service, based on correspondence relationships associated with the first user and the second user set in a database including the first user, the second user, and the third user;
   determine a current availability of the at least one servicing user on the messaging service using the database;
   change the message source of the received message based on results of the determining the current availability of the at least one servicing user; and
   send the message received from the first terminal of the first user as a message from the message source which is changed from the first user to the third user based on the current availability of the at least one servicing user, to the second terminal of the second user over the messaging service.

13. A non-transitory computer-readable recording medium storing computer readable instructions, which when executed by at least one processor, causes the at least one processor to:
   receive a message over a messaging service from a first terminal of a message source to a second terminal of a message recipient, the message source being a first user of the messaging service, and the message recipient being a second user of the messaging service;
   determine at least one servicing user associated with the message recipient, the at least one servicing user including at least a third user of the messaging service, based on correspondence relationships associated with the first user and the second user set in a database including the first user, the second user, and the third user;
   determine a current availability of the at least one servicing user on the messaging service using the database;
   change the message source of the received message based on results of the determining the current availability of the at least one servicing user; and
   send the message received from the first terminal of the first user as a message from the message source which is changed from the first user to the third user based on the current availability of the at least one servicing user, to the second terminal of the second user over the messaging service.

14. The method according to claim 1, wherein
   the at least one servicing user is a plurality of servicing users;
   the first user manages the plurality of servicing users, the plurality of servicing users including the third user; and
   each servicing user of the plurality of servicing users manages a plurality of second users.

15. The method according to claim 1, wherein
   the message corresponds to sales activity performed over the messaging service.

16. The method according to claim 1, wherein
   the first user and the at least one servicing user are members of a first organization; and
   the second user is not a member of the first organization.

17. The method according to claim 1, wherein the determining the current availability of the at least one servicing user includes analyzing a schedule of the at least one servicing user, the schedule stored on the database.

18. The method according to claim 1, further comprising:
   receiving, using the at least one processor, a current availability of the at least one servicing user from at least one terminal of the at least one servicing user;
   updating, using the at least one processor, the current availability of the at least one servicing user in the database; and
   reporting, using the at least one processor, the received current availability of the at least one servicing user to the first terminal.

\* \* \* \* \*